(12) United States Patent
Velammal et al.

(10) Patent No.: US 11,899,570 B2
(45) Date of Patent: Feb. 13, 2024

(54) SYSTEM AND METHOD FOR OPTIMIZING ASSESSMENT AND IMPLEMENTATION OF MICROSERVICES CODE FOR CLOUD PLATFORMS

(71) Applicant: Cognizant Technology Solutions India Pvt. Ltd., Chennai (IN)

(72) Inventors: Parasu Pillai Iyappan Velammal, Chennai (IN); Kumaresan Ramachandran, Chennai (IN); Karthikeyan Mohan, Chennai (IN); Duraivel Kalyanasundaram, Chennai (IN); Jeyashree Pandian Duraipandian, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 144 days.

(21) Appl. No.: 17/553,984

(22) Filed: Dec. 17, 2021

(65) Prior Publication Data

US 2022/0171699 A1 Jun. 2, 2022

Related U.S. Application Data

(63) Continuation-in-part of application No. 16/835,694, filed on Mar. 31, 2020, now Pat. No. 11,237,941.

(30) Foreign Application Priority Data

Dec. 12, 2019 (IN) .............................. 201941051520

(51) Int. Cl.
*H04L 29/08* (2006.01)
*H04L 12/26* (2006.01)
(Continued)

(52) U.S. Cl.
CPC ............ *G06F 11/3692* (2013.01); *G06F 8/61* (2013.01); *G06F 11/3676* (2013.01);
(Continued)

(58) Field of Classification Search
CPC ............ G06F 11/3692; G06F 11/3676; G06F 11/3688; G06F 11/3616; G06F 11/3664;
(Continued)

(56) References Cited

U.S. PATENT DOCUMENTS 8,739,150 B2  5/2014  Gass
9,411,562 B2  8/2016  Venkata Naga Ravi
(Continued)

OTHER PUBLICATIONS

Van Tran et al., Application Migration to Cloud: A Taxonomy of Critical Factors, May 22, 2011, [Retrieved on Sep. 17, 2023]. Retrieved from the internet: <URL: https://dl.acm.org/doi/pdf/10.1145/1985500.1985505> 7 Pages (22-28) (Year: 2011).*
(Continued)

*Primary Examiner* — Anibal Rivera
(74) *Attorney, Agent, or Firm* — CANTOR COLBURN LLP

(57) ABSTRACT

A system and a method for application transformation to cloud by conversion of an application source code to a cloud native code is provided. A first and a second transformation recommendation path is received and a set of remediation templates are applied based on the first and the second transformation recommendation paths where the set of remediation steps comprises pre-defined parameterized actions. The system comprises a microservices unit configured to optimize assessment and implementation of microservices code for multiple target cloud platforms by determining count of microservices anti-patterns in microservices code, wherein the anti-patterns represent a pattern of the microservices code and ascertaining current state of the microservices code by determining a maturity score. A set of
(Continued)

repeatable steps associated with microservices code development are provided in bundled form for accelerated implementation of changes in the microservices code for deployment on the multiple target cloud platforms.

18 Claims, 28 Drawing Sheets

(51) Int. Cl.

| | |
|---|---|
| *G06F 9/445* | (2018.01) |
| *G06F 11/36* | (2006.01) |
| *G06F 8/61* | (2018.01) |
| *H04L 67/01* | (2022.01) |
| H04L 41/08 | (2022.01) |
| G06F 8/20 | (2018.01) |
| H04L 67/148 | (2022.01) |
| G06F 21/57 | (2013.01) |
| H04L 41/14 | (2022.01) |
| H04L 41/5041 | (2022.01) |
| G06F 8/41 | (2018.01) |
| G06F 8/40 | (2018.01) |
| H04L 67/10 | (2022.01) |
| G06F 8/65 | (2018.01) |
| G06F 8/35 | (2018.01) |
| G06F 8/60 | (2018.01) |
| G06F 8/10 | (2018.01) |

(52) U.S. Cl.
CPC .......... *G06F 11/3688* (2013.01); *H04L 67/01* (2022.05); *G06F 8/10* (2013.01); *G06F 8/20* (2013.01); *G06F 8/35* (2013.01); *G06F 8/40* (2013.01); *G06F 8/43* (2013.01); *G06F 8/45* (2013.01); *G06F 8/60* (2013.01); *G06F 8/65* (2013.01); *G06F 21/577* (2013.01); *H04L 41/0886* (2013.01); *H04L 41/145* (2013.01); *H04L 41/5048* (2013.01); *H04L 67/10* (2013.01); *H04L 67/148* (2013.01)

(58) Field of Classification Search
CPC ..... G06F 8/61; G06F 8/60; G06F 8/35; G06F 8/10; G06F 8/20; G06F 8/40; G06F 8/43; G06F 8/45; G06F 8/65; G06F 21/577; H04L 67/01; H04L 67/10; H04L 67/148; H04L 41/145; H04L 41/0886; H04L 41/5048
See application file for complete search history.

(56) References Cited

U.S. PATENT DOCUMENTS

| | | | |
|---|---|---|---|
| 9,519,465 B2 | 12/2016 | Bernecker | |
| 9,608,931 B2 | 3/2017 | Sharma | |
| 10,114,616 B2 | 10/2018 | Delaney | |
| 10,120,670 B1 | 11/2018 | Atkinson | |
| 10,255,081 B2 | 4/2019 | Bijani | |
| 10,452,444 B1 | 10/2019 | Jibaja | |
| 10,713,664 B1 | 7/2020 | Alagappan | |
| 10,728,364 B1 | 7/2020 | Licata | |
| 10,778,513 B2 | 9/2020 | Kishen | |
| 10,872,029 B1 | 12/2020 | Bawcom | |
| 2011/0296391 A1 | 12/2011 | Gass | |
| 2013/0007216 A1 | 1/2013 | Fries | |
| 2014/0359129 A1 | 12/2014 | Sharma | |
| 2015/0142858 A1* | 5/2015 | Bryan | G06F 16/214 |
| | | | 707/809 |
| 2015/0261766 A1 | 9/2015 | Apte | |
| 2017/0012854 A1 | 1/2017 | Balasubramanian | |
| 2017/0017505 A1* | 1/2017 | Bijani | G06Q 10/20 |
| 2017/0155723 A1* | 6/2017 | Sharma | H04L 67/10 |
| 2017/0161044 A1 | 6/2017 | Singh | |
| 2017/0177324 A1 | 6/2017 | Frank | |
| 2017/0180266 A1 | 6/2017 | Frank | |
| 2017/0180459 A1 | 6/2017 | Frank | |
| 2017/0180487 A1 | 6/2017 | Frank | |
| 2018/0285572 A1 | 10/2018 | Hanner | |
| 2019/0121566 A1 | 4/2019 | Gold | |
| 2019/0121889 A1 | 4/2019 | Gold | |
| 2019/0030119 A1 | 10/2019 | Atkinson | |
| 2020/0133651 A1 | 4/2020 | Holzer | |
| 2020/0019550 A1 | 6/2020 | Kishen | |
| 2020/0195500 A1 | 6/2020 | Kishen | |
| 2020/0267216 A1* | 8/2020 | Haggart | G06F 9/5088 |
| 2020/0278920 A1 | 9/2020 | Khakare | |
| 2020/0387357 A1 | 12/2020 | Mathon | |

OTHER PUBLICATIONS

Patricia V. Beserra et al., Cloudstep: A Step-by-Step Decision Process to Support Legacy Application Migration to the Cloud, 2012 IEEE, [Retrieved on Sep. 17, 2023]. Retrieved from the internet: <URL: https://ieeexplore.ieee.org/stamp/stamp.jsp?tp=&arnumber=6392602> 10 Pages (7-16) (Year: 2012).*

Quang Hieu Vu et al., Legacy Application Migration to the Cloud: Practicability and Methodology, 2012 IEEE, [Retrieved on Sep. 17, 2023]. Retrieved from the internet: <URL: https://ieeexplore.ieee.org/stamp/stamp.jsp?tp=&arnumber=6274061> 8 Pages (270-277) (Year: 2012).*

"Accenture cloud application migration services"; Jul. 7, 2014 (https://www.accenture.com/_acnmedia/Accenture/Conversion-Assets/DotCom/Documents/Global/PDF/Technology_9/Accenture-Cloud-Application-Migration-Services.pdf).

"Shifting Gears for Cloud Transformation" May 15, 2018 (https://www.csscorp.com/wp-content/uploads/2018/05/Cloud-Transformation-Services_Brochure_A5.pdf).

Lukas Hahmann et al., Migrating code into the cloud, Aug. 28, 2015, [Retrieved on Aug. 4, 2021] Retrieved from the Internet<URL: https://citeseerx.ist.psu.odu/viewdoc/download?doi=10.1.1.7070.1181&rep=rep1&type=pdf> 86 pages (1-77) (year: 2015).

Mohammad Hajjat et al., Cloudward Bound Planning for Beneficial Migration of Enterprise Applications to the Cloud, 2010 [Retrieved on Aug. 4, 2021] Retrieved from Internet: <URL:htps://dl.acm.org/doi/pdf/10.1145/1851275.1851212> 12 pages (243-254) (Year. 2010).

Zhenggong Cai et al., A Pattern-Based Code Transformation Approach for Cloud Application Migration, 2015 IEEE [Retreived on Aug. 4, 2021] Retrieved from Internet:<URL:https://ieeexplore.ieee.org/stamp/stamp.jsp?tp=&arnumber=7214025> 8 pages (33-40) (Year: 2015).

* cited by examiner

Enter Project Name

Project Name

Provide input for microservices code assessment

Specify technology

Java                    NET

Which tool did you use to create boilerplate code?    I wrote my own code

Specify Source Code Repository Details

Git                    File System

Source Code Repository

FIG. 4I

Enter Project Name

Project Name | test 1

Provide input for microservices code assessment

Specify technology

Spring Initializer
Micronaut
JHipster
Which tool did you use to create boilerplate code? | I wrote my own code Specify Source Code Repository Details

FIG. 4J

Project Name

Provide input for microservices code assessment

Specify technology      Java           .NET

Which tool did you use to create boilerplate code?    I wrote my own code

Specify Source Code Repository Details

Source Code Repository      Git           File System

Upload Project Source Code zip

Specify Target Platform

Specify Target Platform for Applications

Run Code Assessment      Ok

FIG. 4M

```
Greenfield Transformation Path          Microservices Assessment Report          Workflow Progression Applied Greenfield Transformation Path Code Git URL. https://github.com/ThecognizantFoundry/FEGOTraining-productAPIK8S/tree/migrationToCloud Code Git Branch: MigrationToCloud Spring Boot optimization View Transformation Path Recommendations
• Other runtime options that can be further pursued to optimize Spring boot options are
  1. no Verify
  2. TieredStopAtlevel1
  3. Class Data Sharing
  4. Lazy Actuator

• Please note that all the above options may have side-effects of code functionality and must be verified
  before production usage.
```

FIG. 4R

Technical Summary

| Summary | | |
|---|---|---|
| Primary Language | Java 1.8 | |
| Secondary Language | | |
| GUI Language | | |
| App Server | | |
| Primary Framework | SpringBoot 2.3.3.release, Spring | |
| Secondary Framework | | |
| FrontEnd Framework | | |

| Counts | |
|---|---|
| Lines of Code | 501 |
| Java | 139 |
| Properties | 3 |
| XML | 49 |
| Others | 310 |
| Classes | 5 |

External Interfaces/Dependencies (2)

| Interface | Count |
|---|---|
| Webservice | 1 |
| RESTService | 1 |

| Libraries | |
|---|---|
| Junit Test Framework | |

Microservices Anti-Patterns -Detail

Group           Documentation

Sub Group       Contract_Exposure

Type            Tooling

Description     Documentation tools help generate contracts and specifications for microservices and is an essential part of the development process.

Location

Recommendation  Microservices must adequately document the APIs and they should be made available as contracts for upstream and downstream consumers.

Group           ServiceDiscovery

Sub Group       ServiceDiscovery Mechanism

Type            ServiceDiscovery-Dependency

Description.    Application does not have a service discovery mechanism defined.

Location

Recommendation  Applications must leverage a Service Discovery pattern when deployed within a cluster environment.

Group           External Config

Sub Group       Best_Practices

Type            Dependencies

Description.    Absence of dependencies for reading configuration info from external sources Location Recommendation  Microservices must rely on configuration info from external sources. This best practice will separate concerns and service can be deployed across multiple environments.

Cloud Anti-Patterns Detail

Group        Environmental Variables
Sub Group    Read
Type         System.getnv.methodcall
Description  Access to environment variable-Getting environment variables
Location     sre/.mvn/wrapper/MavenWrapperDownloader.Java (Line numbers-98,98,99,100)
Recommendation Environment variables must not be hardcoded within application. Cloud Apps must define variables within config files and they must be stored in version control systems for centralized management. Named profiles can be used for managing definitions across environments.

Group        External Interface                          Severity     Warning
Sub Group    WebService                                  Action Type  CodeChangeExternalCall
Type         URL/URLInstance creation                    15 Factor    BackingService
Description  WebService
Location     sre/.mvn/wrapper/MavenWrapperDownloader.Java (Line numbers 108)
Recommendation Native network calls must be avoided for application moving to cloud. Native network calls are written with the support of specific protocols like TCP, multicast, etc.Such dependenciesmay not be supported in the target cloud platform. Recommended remediation is to design network communication using patterns such as HTTP Rest API, port binding and broker-based messaging platforms.

FIG. 4X

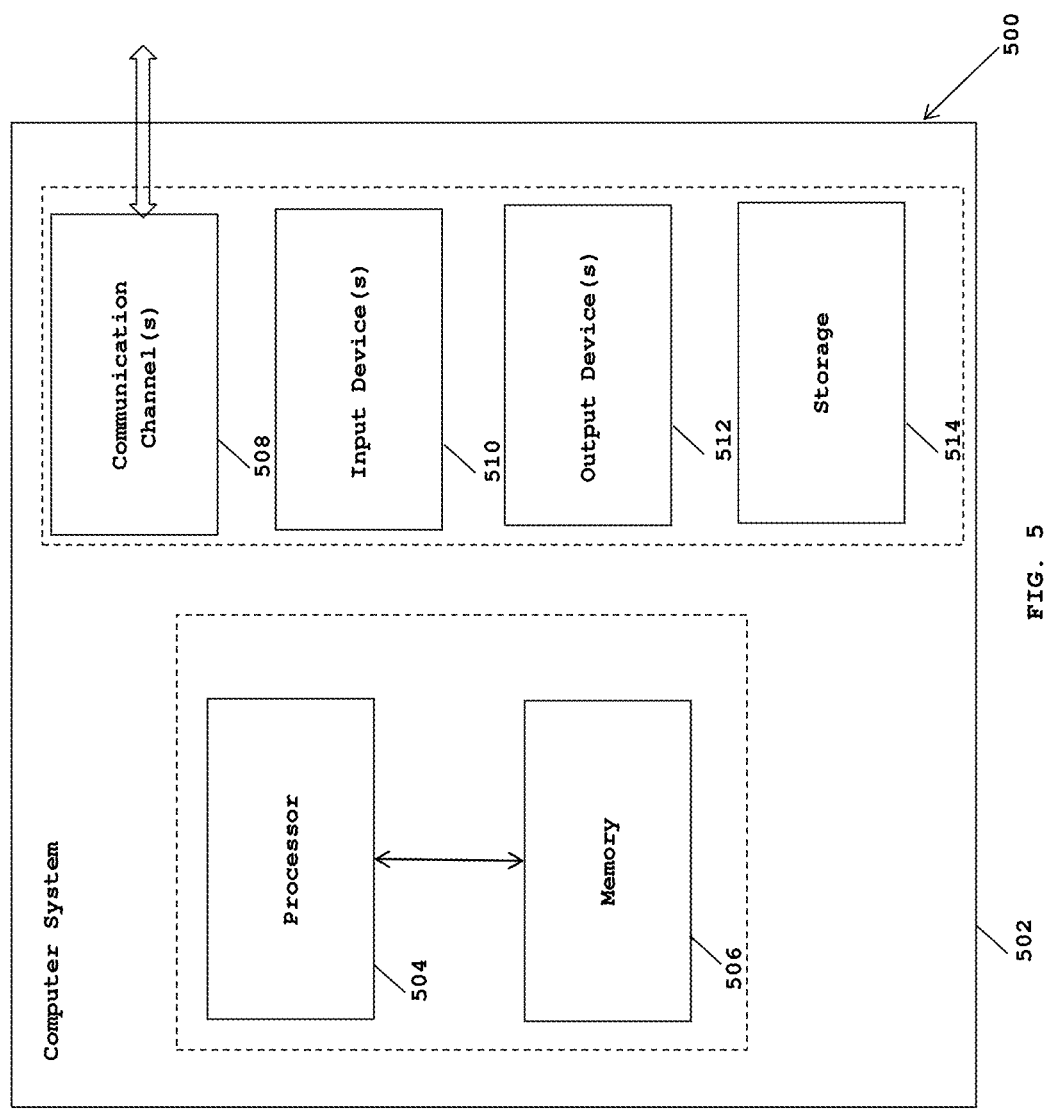

SYSTEM AND METHOD FOR OPTIMIZING ASSESSMENT AND IMPLEMENTATION OF MICROSERVICES CODE FOR CLOUD PLATFORMS

CROSS-REFERENCE TO RELATED APPLICATIONS

This application is a continuation in part of U.S. application Ser. No. 16/835,694 filed on Mar. 31, 2020 now U.S. Pat. No. 11,237,941, which claims the benefit of priority to Indian Patent Application No. 201941051520 filed on Dec. 12, 2019, the disclosure of which is hereby expressly incorporated.

FIELD OF THE INVENTION

The present invention relates generally to the field of cloud migration and application transformation. More particularly, the present invention relates to a system and a method for optimizing assessment and implementation of microservices code for multiple cloud platforms.

BACKGROUND OF THE INVENTION

With more and more infrastructure and applications moving to cloud in support of digital transformation, cloud migration and application transformation are getting complex and expensive. Before the advent of cloud platforms, custom applications were developed in programming languages like Java, C# etc., and applicable best practices and standards were followed. However, in order to take advantage of benefits provided by cloud platforms, several organizations are increasingly striving to move their application to cloud platform. It has been observed that some of the practices (like writing logs to the file system) in these applications are not compatible with cloud platforms. Hence, source code for these applications need modification before moving them to the cloud platform.

Typically, migration teams analyze and determine the best approach for application cloud transformation based on trial and error. This is, however a very long and time-consuming process. Further, the application transformation to cloud requires intensive manual process steps that could extend up to a few months depending on the complexity. It has been observed that existing techniques of moving application to cloud is predominantly a manual, error-prone process often resulting in high rework and maintenance efforts.

Further, currently, there is no common platform available where tried and tested solutions can be referenced for future transformations. Different tools are available in the market but these tools are suited to address only a particular need. Therefore, as different tools are used for the cloud migration process, there is an increased complexity and cost for the clients. There are also different transformation scenarios known across different knowledge acquiring phases. However, in the whole process, knowledge gained by the teams while migrating the applications to cloud somewhere gets lost. Enterprises struggle to find qualified cloud architects and engineers to implement the same.

In light of the above drawbacks, there is a need for a system and a method for carrying out efficient and structured migration of applications to cloud. There is a need for a system and a method of cloud migration with minimum human intervention. Further, there is also a need for reducing duration of application to cloud transformation.

SUMMARY OF THE INVENTION

In various embodiments of the present invention, a system for application transformation to cloud by conversion of an application source code to a cloud native code is provided. The system comprises a memory storing program instructions and a processor configured to execute program instructions stored in the memory. The system comprises an application transformation to cloud engine executed by the processor and configured to receive a first and a second transformation recommendation paths and apply a set of remediation templates based on the first and the second transformation recommendation paths. The set of remediation steps comprises pre-defined parameterized actions. The application transformation to cloud engine is configured to build definition of classes of the application source code and apply a pre-defined transformation process flow on the application source code based on the first and the second transformation recommendation paths to transform the application source code to the cloud native code. The application transformation to cloud engine is configured to apply a reusable service template on the application source code, based on the first and the second transformation recommendation paths, wherein the reusable service template applies repeatable code changes required for integration and deployment of the cloud native code to a cloud platform.

In another embodiment of the present invention, the system comprises a microservices unit configured to optimize assessment and implementation of microservices code for multiple target cloud platforms by determining a count of microservices anti-patterns in a microservices code. The anti-patterns represent a pattern of the microservices code that is not compatible with a target cloud platform and are not aligned with industry best practices on developing microservices architectures. The microservices unit is configured to ascertain a current state of the microservices code by determining a maturity score. The maturity score is indicative of an extent to which characteristics associated with the microservices code is aligned with predetermined microservices architecture characteristics. The microservices unit is configured to provide a set of repeatable steps associated with microservices code development in a bundled form for accelerated implementation of changes in the microservices code for deployment on the multiple target cloud platforms.

In an embodiment of the present invention, the micro services anti-patterns are associated with service discovery, API decomposition, reliability, service communication, fault tolerance and distributed tracing, transaction management, exception handling, caching, documentation, externalize configuration, code coverage, API security and observability.

In another embodiment of the present invention, the maturity score is rendered via a radar chart depicting the scores across all the microservices characteristics. In yet another embodiment of the present invention, the microservices unit comprises an assessment unit configured to provide a repository type. The repository type includes at least one of a folder location where users upload application source code and a source code repository URL of the microservices code which provide details associated with the microservices code including Git access token, source branch, boilerplate tool used to generate a source code and a target branch of the target cloud platform for deployment of the micro services code.

In another embodiment of the present invention, the microservices unit comprises an assessment unit configured to determine the count of microservices anti-patterns in a microservices code based on analysis of information including group, sub-group, type, description, location, file, line number details associated with the anti-patterns. In another embodiment of the present invention, the maturity score comprises a characteristic score on a scale of '0' to '10' representative of the extent to which the characteristics associated with the microservices code is aligned with predetermined microservices architecture characteristics.

In an embodiment of the present invention, the characteristic score is determined by ascertaining a net score for each of the characteristics associated with the microservices code, wherein the net score is based on an actual score and a weightage assigned to each of the characteristics. The weightage is assigned based on a predefined numerical assessment of the relative importance of each of the characteristics. The actual score is a score assigned to each of the characteristics based on the source code scanning outcome and a predetermined scoring criterion determining a normalised score for each of the characteristics associated with the microservices code. The normalised score is determined based on normalizing the net score against the maximum net score on a scale of 1 to 10 and where the maximum net score is based on a predetermined numerical assessment of the maximum possible net score achievable by any microservices application. A final characteristic score is determined for the microservices code based on a sum of the net score of all the characteristics and a maximum sum of the net score of all the characteristics. In another embodiment of the present invention, the maximum sum of the net score of all the characteristics is based on a predetermined numerical assessment of the maximum possible sum of the net score across all the characteristics achievable by any microservices application.

In an embodiment of the present invention, the maturity score associated with the patterns corresponding to the microservices code includes a percentage number associated with each of the patterns. The percentage number indicates a level of implementation of the microservices code. In yet another embodiment of the present invention, the percentage number includes a percentage number from 0% to 40% on the patterns associated with the microservices code that indicates that the pattern is either 'not implemented' or 'poorly-implemented', a percentage number between 40% and 70% that indicates that the patterns are 'moderately-implemented' and a percentage number greater than 70% that indicates that the patters are 'well-implemented'.

In another embodiment of the present invention, the microservices unit comprises an accelerated transformation unit configured to provide the set of repeatable steps based on execution of a pre-defined workflow to implement changes in the microservices code responsive to selection of one or more repeatable steps from the set of repeatable steps.

In various embodiments of the present invention, a method for application transformation to cloud by conversion of an application source code to a cloud native code is provided. The method comprises receiving a first and a second transformation recommendation paths and applying a set of remediation templates based on the first and the second transformation recommendation paths, where the set of remediation steps comprises pre-defined parameterized actions. The method comprises building definition of classes of the application source code and applying a pre-defined transformation process flow on the application source code based on the first and the second transformation recommendation paths to transform the application source code to the cloud native code. The method comprises applying a reusable service template on the application source code, based on the first and the second transformation recommendation paths, wherein the reusable service template applies repeatable code changes required for integration and deployment of the cloud native code to a cloud platform.

In another embodiment of the present invention, the method comprises optimizing assessment and implementation of microservices code for multiple target cloud platforms by determining a count of microservices anti-patterns in a microservices code. The anti-patterns represent a pattern of the microservices code that is not compatible with a target cloud platform and is not aligned with the industry best practices on developing microservices architectures. The method comprises ascertaining a current state of the microservices code by determining a maturity score where the maturity score is indicative of an extent to which characteristics associated with the microservices code is aligned with predetermined microservices architecture characteristics. The method comprises providing a set of repeatable steps associated with microservices code development in a bundled form for accelerated implementation of changes in the microservices code for deployment on multiple target cloud platforms.

In yet another embodiment of the present invention, the method comprises providing either a repository type including at least one of a folder location where users upload application source code and a source code repository URL of the microservices code which provides details associated with the microservices code including Git access token, source branch, boilerplate tool used to generate a source code and a target branch of the target cloud platform for deployment of the micro services code. In another embodiment of the present invention, the method comprises the step of determining the count of microservices anti-patterns in a microservices code comprises analysis of information including group, sub-group, type, description, location, file, line number details associated with the anti-patterns.

In an embodiment of the present invention, the maturity score comprises a characteristic score on a scale of '0' to '10' representative of the extent to which the characteristics associated with the microservices code is aligned with predetermined microservices architecture characteristics. In another embodiment of the present invention, the characteristic score is determined by ascertaining a net score for each of the characteristics associated with the microservices code. The net score is based on an actual score and a weightage assigned to each of the characteristics. The weightage is assigned based on a predefined numerical assessment of the relative importance of each of the characteristics. The actual score is a score assigned to each of the characteristics based on the source code scanning outcome and a predetermined scoring criterion.

In another embodiment of the present invention, the method comprises determining a normalised score for each of the characteristics associated with the microservices code. The normalised score is determined based on normalizing the net score against the maximum net score on a scale of 1 to 10. The maximum net score is based on a predetermined numerical assessment of the maximum possible net score achievable by any microservices application. The method comprises determining a final characteristic score for the microservices code based on a sum of the net score of all the characteristics and a maximum sum of the net score of all the characteristics. The maximum sum of the net score of all the characteristics is based on a predetermined numerical assessment of the maximum possible sum of the net score achievable across all the characteristics by any microservices application.

In an embodiment of the present invention, the maturity score associated with the patterns corresponding to the microservices code includes a percentage number associated with each of the patterns. The percentage number indicates a level of implementation of the microservices code. In yet another embodiment of the present invention, the percentage number includes a percentage number from 0% to 40% on the patterns associated with the microservices code that indicates that the pattern is either 'not implemented' or 'poorly-implemented', a percentage number between 40% and 70% that indicates that the patterns are 'moderately-implemented' and a percentage number greater than 70% that indicates that the patters are 'well-implemented'. In another embodiment of the present invention, the step of providing the set of repeatable steps comprises execution of a pre-defined workflow to implement changes in the microservices code responsive to selection of one or more repeatable steps from the set of repeatable steps.

BRIEF DESCRIPTION OF THE ACCOMPANYING DRAWINGS

The present invention is described by way of embodiments illustrated in the accompanying drawings wherein:

FIG. 4I illustrates a graphical user interface through which project details such as technology, boiler plate code generation tools and a repository type are rendered for selection, in accordance with an embodiment of the present invention;

FIG. 4J illustrates a graphical user interface through which project details such as technology, a list of boiler plate code generation tools and a repository type are rendered for selection, in accordance with another embodiment of the present invention;

FIG. 4M illustrates details to be collected from a user when a source code repository option is selected as 'File System', in accordance with an embodiment of the present invention;

FIG. 4R illustrates a summary of the accelerated transformation paths, in accordance with an embodiment of the present invention;

FIG. 4V illustrates a technical summary report indicating technology and external/internal dependencies, in accordance with an embodiment of the present invention;

FIG. 4W illustrates microservices anti-pattern details, in accordance with an embodiment of the present invention;

FIG. 4X illustrates cloud anti-pattern details, in accordance with an embodiment of the present invention;

FIG. 5 illustrates an exemplary computer system in which various embodiments of the present invention may be implemented.

DETAILED DESCRIPTION OF THE INVENTION

The present invention discloses a system and a method for executing a semi-automated workflow for application transformation and cloud migration. Further, the present invention discloses a system and a method where pre-defined transformation process flows serve as starting points for cloud migration. The present invention, further, provides for a single platform that is capable of employing reusable techniques across different transformation scenarios for migration of application to cloud.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
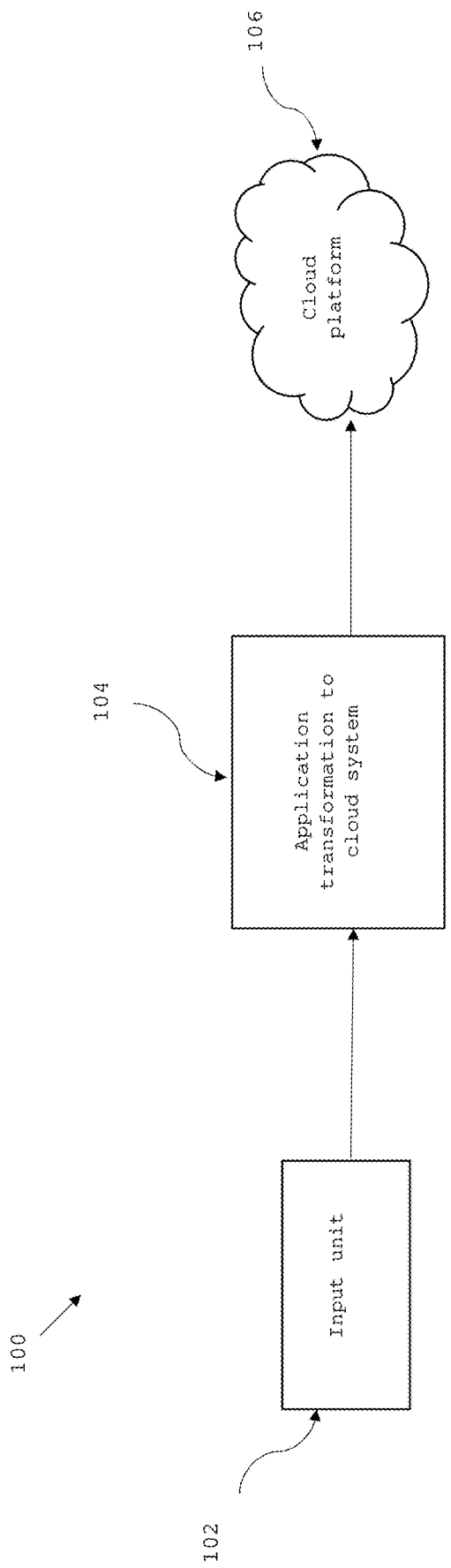
FIG. 1 is a block diagram of a system for application transformation to cloud, in accordance with an embodiment of the present invention.

FIG. 1 is a block diagram of an application transformation and cloud deployment system 100 for transforming an application to cloud, in accordance with an embodiment of the present invention. Referring to FIG. 1, in an embodiment of the present invention, the system 100 comprises an input unit 102, an application transformation to cloud system 104 and a cloud platform 106 where the application is to be integrated and deployed. The application transformation to cloud system 104 is configured to receive an application source code via the input unit 102. In an exemplary embodiment of the present invention, the input unit 102 is configured to receive inputs from the application source code. In another exemplary embodiment of the present invention, the input unit 102 is configured to receive inputs from a user. The application transformation to cloud system 104 is configured to transform the application source code received from the input unit 102 into a cloud native code based on pre-defined transformation process flows which is deployable on the cloud platform 106. In yet another exemplary embodiment of the present invention, the input unit 202 is a graphical user interface for receiving inputs from the user.

In various embodiments of the present invention, the cloud platform 106 may be selected by configuring migration settings specific to a selected cloud platform via a graphical user interface of the application transformation and application transformation to cloud system 104. Users may include developers and cloud architects who are responsible for cloud migration services. In an exemplary embodiment of the present invention, the code may be deployed in a pivotal cloud foundry (PCF) cloud platform 106. In another exemplary embodiment of the present invention, the code may be deployed in a Red Hat OpenShift cloud platform 106. In yet another exemplary embodiment of the present invention, the code may be deployed in an amazon web services (AWS) cloud platform 106. In another embodiment of the present invention, the code may be deployed in a microsoft azure cloud platform 106.

Figure 2:
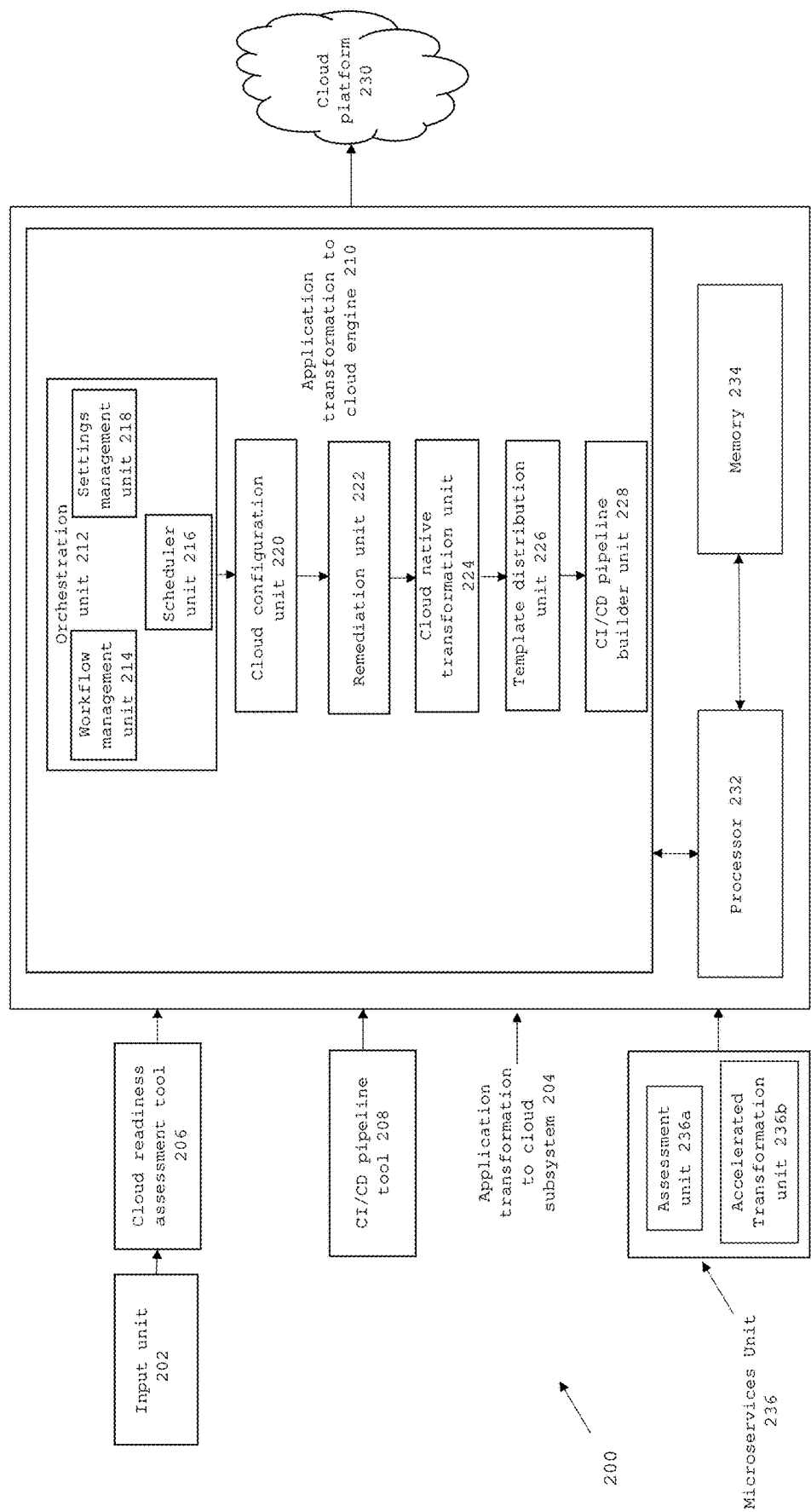
FIG. 2 is a detailed block diagram of a system for application transformation to cloud, in accordance with an embodiment of the present invention.

FIG. 2 is a detailed block diagram of an application transformation to cloud system 200 for transforming an application source code to cloud by employing a semi-automated workflow, in accordance with an embodiment of the present invention. The application transformation to cloud system 200 comprises an application transformation to cloud subsystem 204, a input unit 202, a cloud readiness assessment tool 206, a CI/CD pipeline tool 208 and a cloud platform 230. The application transformation to cloud subsystem 204 interfaces with the cloud readiness assessment tool 206 and the CI/CD pipeline tool 208 at one end and the cloud platform 230 on the other end. The cloud readiness assessment tool 206 and the CI/CD pipeline tool 208 are interfaced with the application transformation to cloud subsystem 204 via a communication channel (not shown).

In various embodiment of the present invention, a plurality of tools may be interfaced with the application transformation to cloud subsystem 204. In an embodiment of the present invention, the input unit 202 is connected to the cloud readiness assessment tool 206 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, message queues, HTTP API calls, a local area network (LAN), a metropolitan area network (MAN) and a wide area network (WAN).

In an embodiment of the present invention, the application transformation to cloud subsystem 204 comprises an application transformation to cloud engine 210, a processor 232 and a memory 234. In an embodiment of the present invention, the application transformation to cloud engine 210 has multiple units which work in conjunction with each other for automatic transformation of the source code and for integrating and deploying application source code on the cloud platform 230. The various units of the application transformation to cloud engine 210 are operated via the processor 232 specifically programmed to execute instructions stored in the memory 234 for executing respective functionalities of the units of the engine 210 in accordance with an embodiments of the present invention.

In another embodiment of the present invention, the subsystem 204 may be implemented as a client-server architecture. In this embodiment of the present invention, a client terminal accesses a server hosting the subsystem 204 over a communication network. The client terminals may include, but are not limited to, a smart phone, a computer, a tablet, microcomputer or any other wired or wireless terminal. The server may be a centralized or a decentralized server.

In an embodiment of the present invention, the application transformation to cloud engine 210 receives the application source code from the input unit 202 via the cloud readiness assessment tool 206. In an exemplary embodiment of the present invention, the cloud readiness assessment tool 206 may be selected by a user via the settings management unit 218 (explained in detail in later part of the specification) within the application transformation to cloud engine 210. The application transformation to cloud subsystem 204 is configured with a built-in-intelligent mechanism for automatic transformation of the application source code into a cloud native code and for integration and deployment of the application source code on a selected cloud platform 230.

Figure 4A:
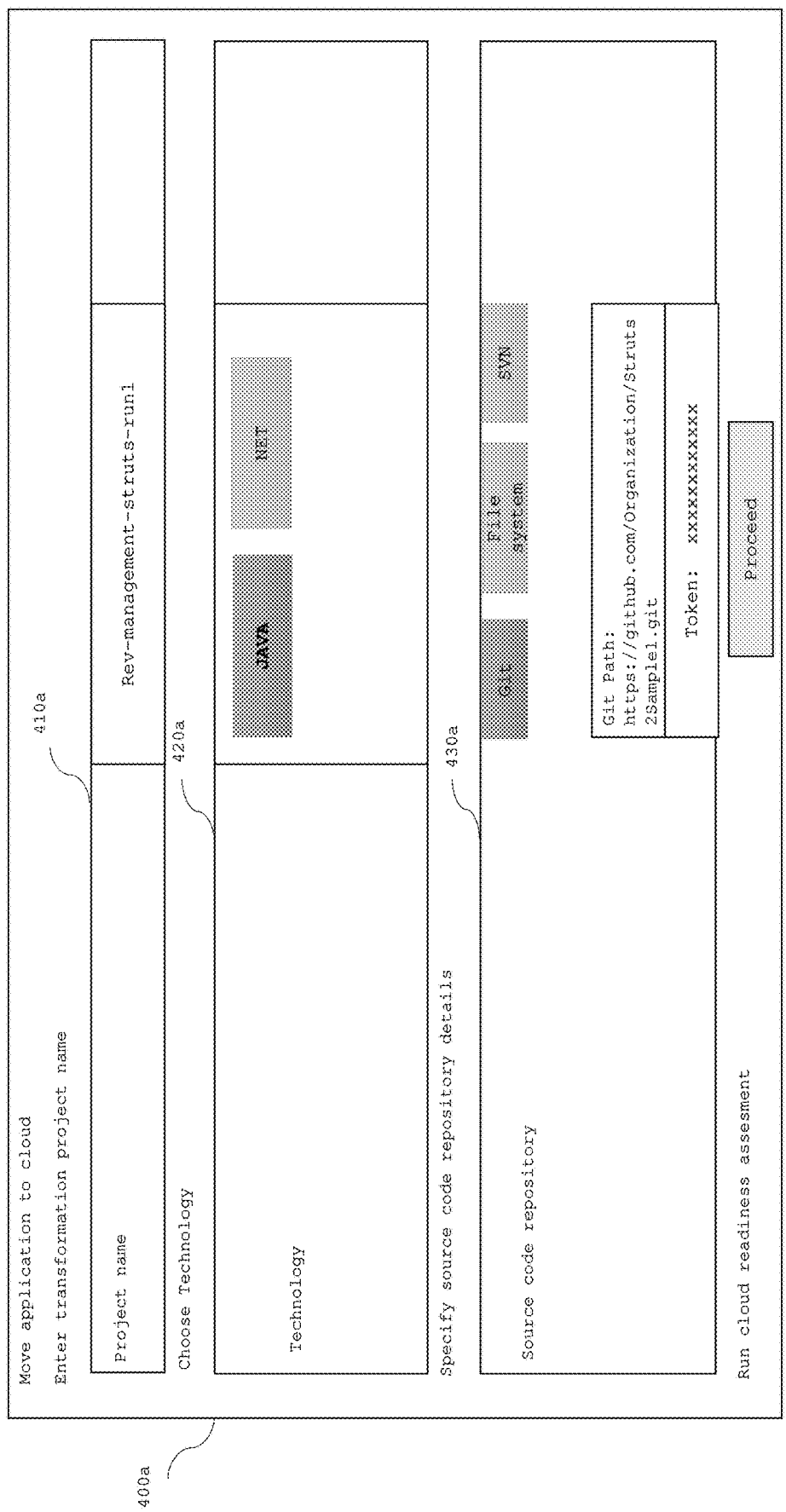
FIG. 4A is an exemplary graphical user interface through which project details and application source code are received as input, in accordance with an embodiment of the present invention.

In operation, in an embodiment of the present invention, the cloud readiness assessment tool 206 is configured to receive the application source code from the input unit 202 and assess the application source code to recommend a transformation path. In particular, for cloud readiness assessment, technology of the application source code to be assessed, a source code repository path for the source code, and the cloud platform 230 selectable by the user are rendered via the graphical user interface (as shown in FIG. 4A). Examples of the source code repository may include, but is not limited to, Subversion (SVN), Azure Repos, GitHub, Git Lab, AWS CodeCommit, and GCP Cloud Source Repositories.

In various embodiments of the present invention, the cloud readiness assessment tool 206 is configured to provide a cloud readiness assessment report. In an embodiment of the present invention, the report includes, but is not limited to, technology stack suitability, migration complexity and list of cloud anti-patterns. In another embodiment of the present invention, the report may include, migration transformation recommendation paths. In an embodiment of the present invention, the migration transformation recommendation includes a first transformation recommendation path. In an embodiment of the present invention, the first transformation recommendation path may be a "replatform" path which denotes that minimal code change would be required to move the application source code to the cloud platform 230. In another embodiment of the present invention, the migration transformation recommendation includes a second transformation recommendation path. In an exemplary embodiment of the present invention, the second transformation recommendation path may be a "refactor" path which denotes that a significant amount of changes to the source code would be required to move the application source code to the cloud platform 230. In yet another embodiment of the present invention, the migration transformation recommendation includes a third transformation recommendation path. In an exemplary embodiment of the present invention, the third transformation recommendation path may be a "rehost" path which denotes that the application source code can be moved to the cloud platform 230 with some configuration changes alone. In another embodiment of the present invention, the migration transformation recommendation includes a fourth transformation recommendation path. In an exemplary embodiment of the present invention, the fourth transformation recommendation path may be a "rebuild" path which denotes that the application source code cannot be reused and new application source code is to be written to host the application source code in the cloud platform 230. In an embodiment of the present invention, out of the transformation path recommendations, the cloud readiness assessment tool 206 may suggest a particular transformation path recommendation which may be accepted by the user or may be overridden to choose another transformation path recommendation. In an exemplary embodiment of the present invention, the transformation path recommendations may be downloadable in a Common Separated Values (CSV) format.

Referring to FIG. 4A, an exemplary graphical user interface 400a is illustrated for creation of a project by specifying a project name 410a for the transformation and deployment of the application to the cloud platform 106 (as shown in FIG. 4A). In accordance with an exemplary embodiment of the present invention, technology of the application source code to be assessed 420a, a source code repository path for the source code 430a are provided as input. In an embodiment of the present invention, a message is triggered to the cloud readiness assessment tool 206 to generate a cloud readiness assessment report. This tool analyses the source code, identifies the cloud anti-patterns and provides one of the following transformation path recommendations—Rehost, Replatform, Refactor and Rebuild. The user can accept the recommendation or chose to override it by selecting another.

Figure 4B:
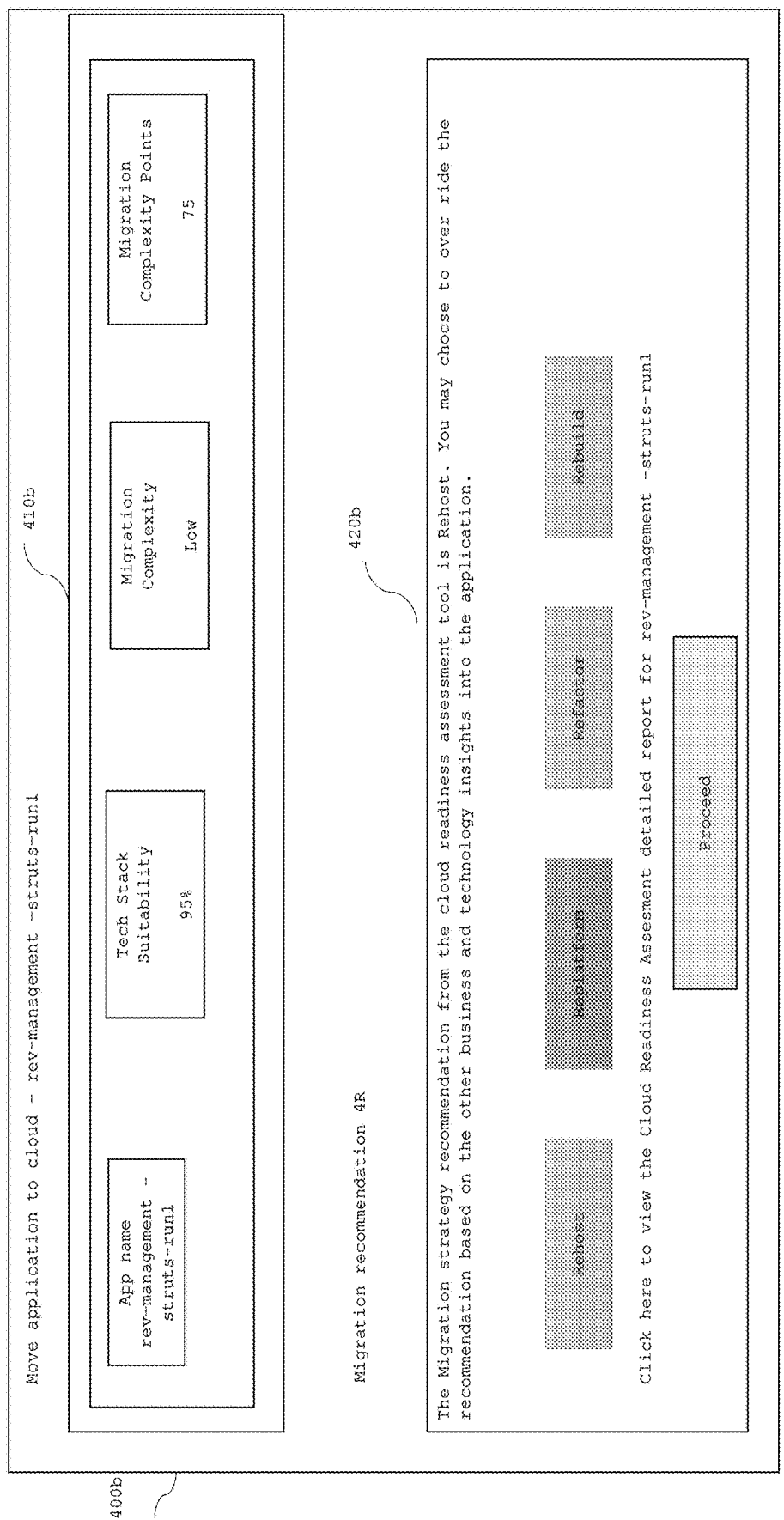
FIG. 4B is an exemplary graphical user interface through which results of cloud suitability analysis and migration strategy recommendations are rendered.

Referring to FIG. 4B, an exemplary graphical user interface 400b is illustrated showing the cloud readiness assessment results 410b. Further the transformation path recommendations 420b are provided which may be accepted by the user or may be overridden to select other recommendations.

Figure 4C:
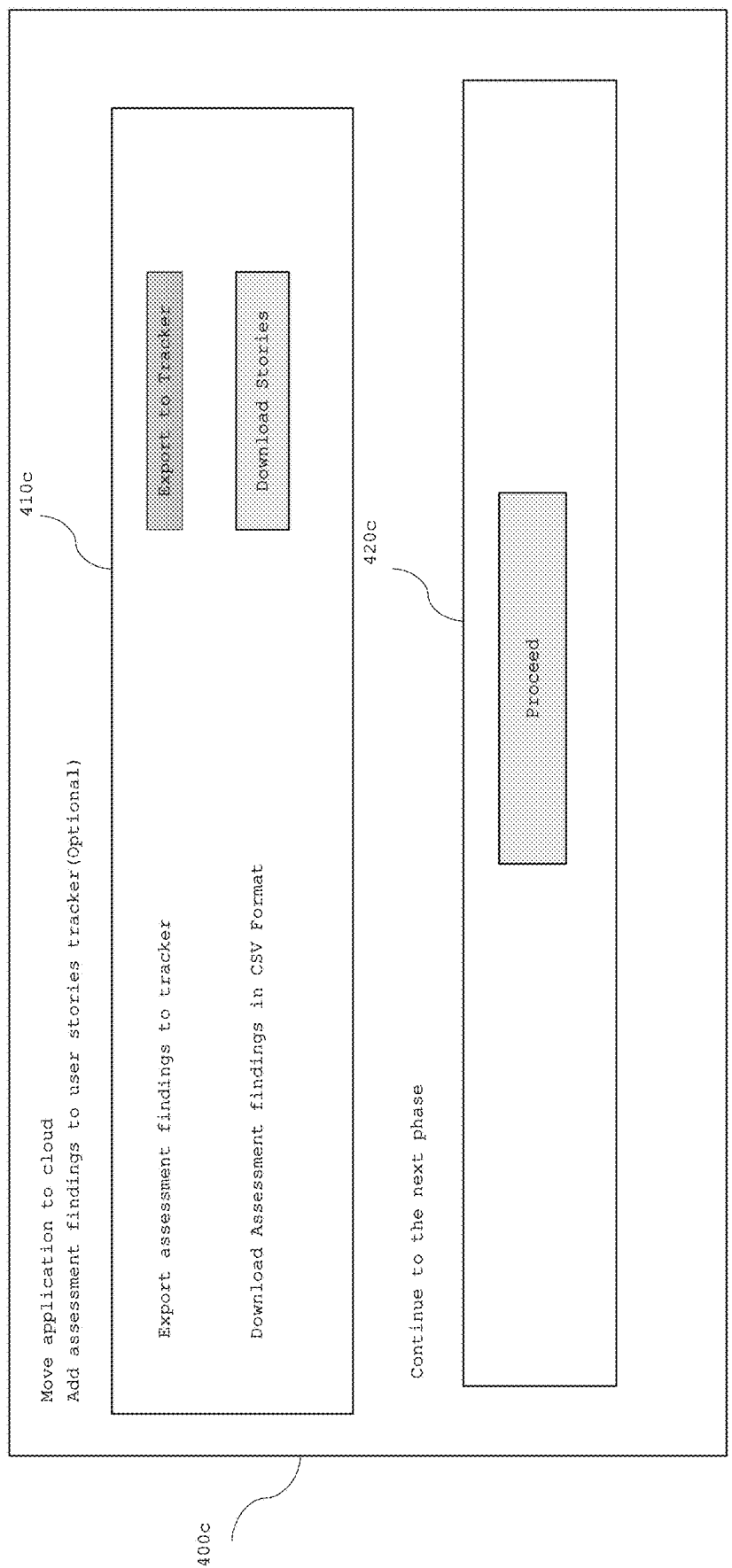
FIG. 4C is an exemplary graphical user interface that lists anti-patterns that are downloadable in a CSV file format.

Referring to the FIG. 4C, an exemplary graphical user interface 400c is illustrated which provides a list of anti-patterns that can be downloaded in CSV file format. In an embodiment of the present invention, the anti-pattern is a pattern of code that is not applicable or does not work in a cloud environment. In an example, the anti-pattern may include wriing logs to a local file system, instead of streaming and writing to a remote file system. In another example, anti-pattern may include a plurality of files created by the local file system operation that may not be accessible to a plurality of subsequent requests. In another example, the anti-patterns may include using a application sever specific library that may not be available in the cloud environment.

Figure 4D:
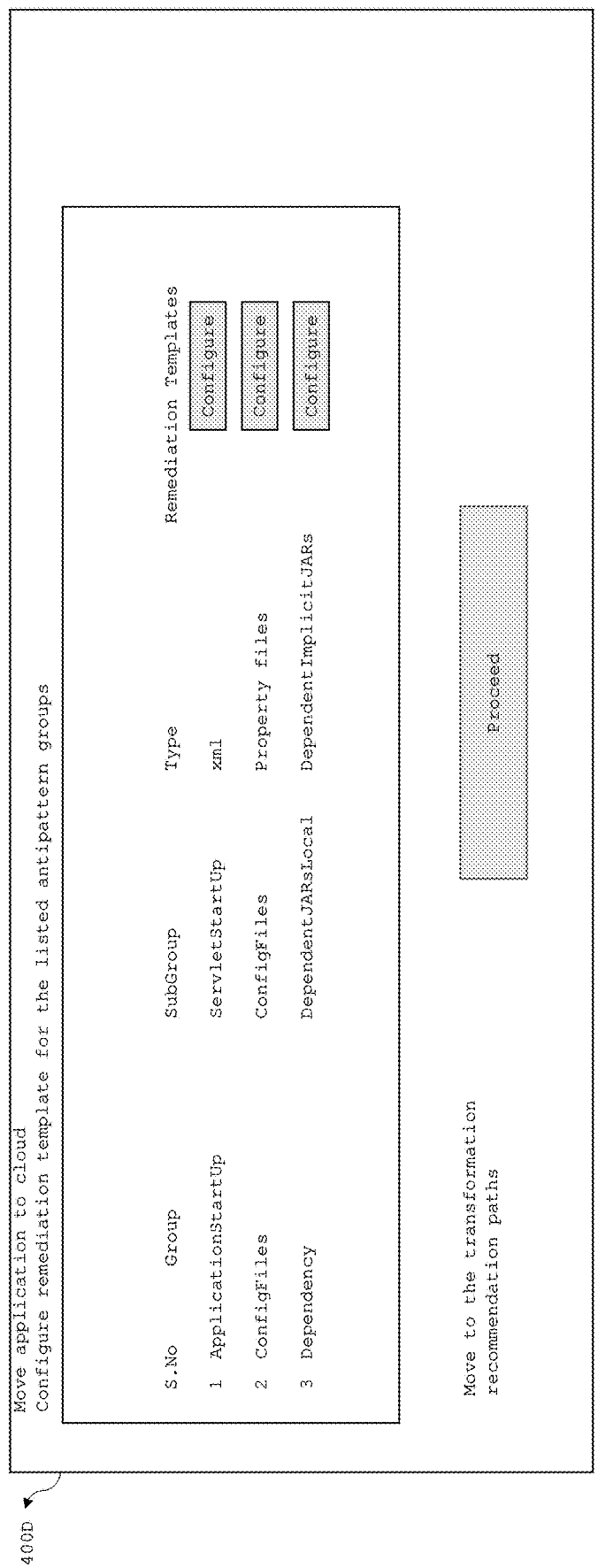
FIG. 4D is an exemplary graphical user interface that provides anti-patterns identified and a provision to associate remediation templates to remediate the anti-patterns.

Referring to the FIG. 4D, an exemplary graphical user interface 400D is illustrated which provides a list of the anti-patterns detected by the cloud readiness assessment tool and a provision to define a remediation template corresponding to the detected anti-pattern.

Figure 4E:
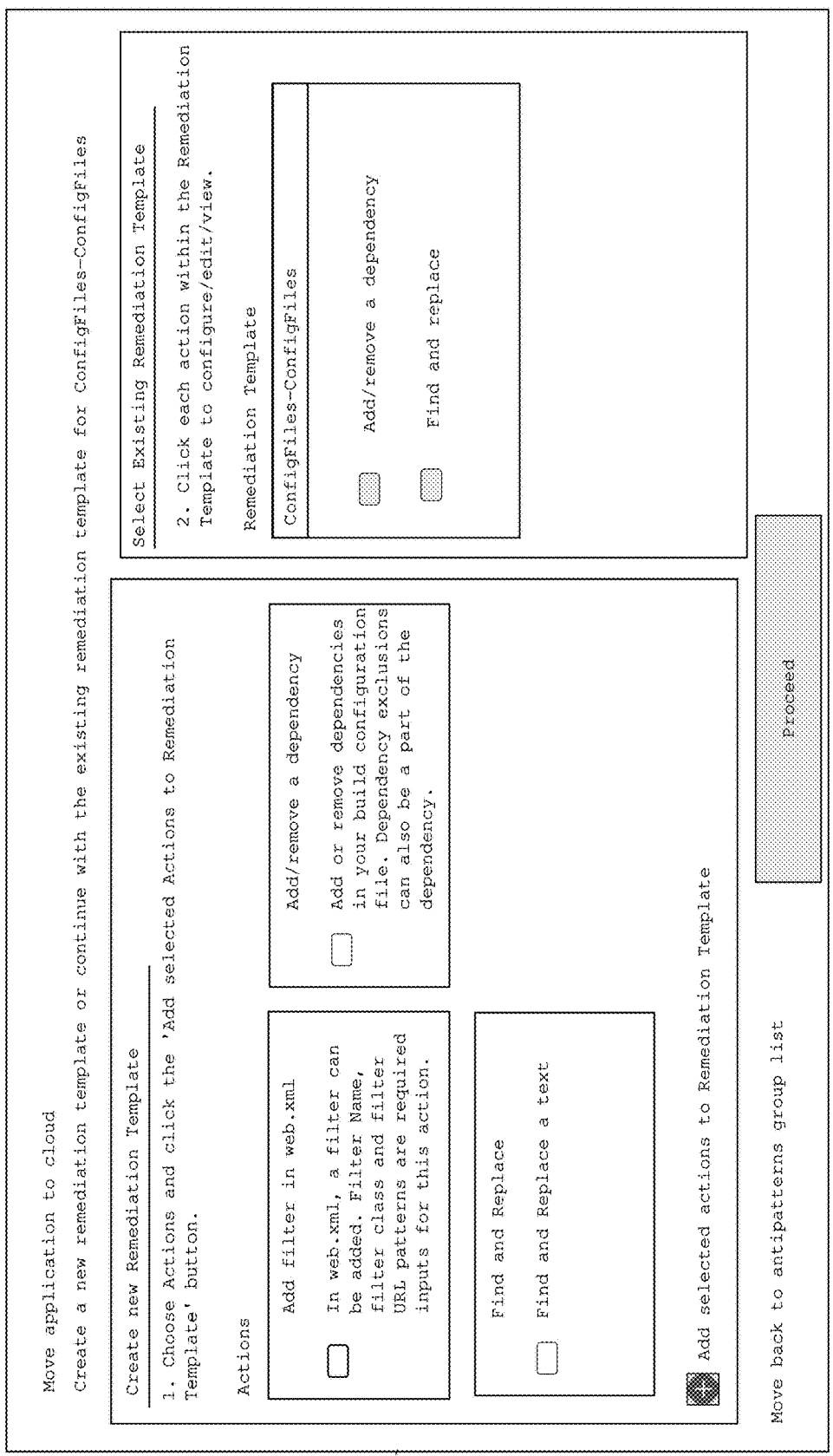
FIG. 4E is an exemplary graphical user interface that provides an option to create a new remediation template or continue with the existing remediation templates.

Referring to FIG. 4E, an exemplary graphical user interface 400E is illustrated which enables the user to either associate an existing remediation template or define a new remediation template and associate it to the detected anti-pattern. In an embodiment of the present invention, a remediation template comprises of multiple actions. In an embodiment of the present invention, the multiple actions comprise implementing a pre-defined, parameterized change to the application source code. In an example, the parametrized changes may include "find and replace a string", "add/delete an import statement", and "add/delete dependencies".

In an embodiment of the present invention, the application transformation to cloud engine 210 comprises an orchestration unit 212, a cloud configuration unit 220, a remediation unit 222, a cloud native transformation unit 224, a template distribution unit 226 and a CI/CD pipeline builder unit 228.

In an embodiment of the present invention, the orchestration unit 212 of the application transformation to cloud engine 210 is configured to execute the semi-automated workflow based on the transformation recommendation path provided by the cloud readiness assessment tool 206. The semi-automated workflow represents various stages which are executed to carry out various tasks. In an exemplary embodiment of the present invention, the semi-automated workflow for the application transformation is uniquely identified by a project name via the graphical user interface (as shown in FIG. 4A).

In an embodiment of the present invention, the orchestration unit 212 comprises a workflow management unit 214, a scheduler unit 216 and a settings management unit 218. The workflow management unit 214 is configured to list multiple semi-automated workflows to be executed by the orchestration unit 212. The workflow management unit 214 renders information on stages of execution of the workflow via the graphical user interface (as shown in FIG. 4B) Further, the workflow management unit 214 also renders a result summary of the execution of the workflow.

In an embodiment of the present invention, the scheduler unit 216 in communication with the workflow management unit 214 is configured to periodically check status of the workflow by calling an application program interface (API) end-point. In an embodiment of the present invention, the settings management unit 218 is configured to enable the user to manage selection of various transformation tools like cloud readiness assessment tool 206 and CI/CD pipeline tool 208 that would be used in the transformation of the application source code to the cloud native code and for integration and deployment of the cloud native code on the selected cloud platform 230. In an embodiment of the present invention, other tools may also be interfaced with the application transformation to cloud subsystem for the execution of the workflow. The settings management unit 218 also enables the user to define CI/CD templates and reusable service templates.

In an embodiment of the present invention, the cloud configuration unit 220 is configured to create configuration artifacts specific to the selected cloud platform 230. In an embodiment of the present invention, the cloud configuration unit 220 creates a manifest.yaml file which is used to deploy source code applications to a pivotal cloud foundry cloud platform 230. In an example, the manifest.yaml file includes the below mentioned content:

applications:
    name: SpringDemo-2
    memory: 1 G
    instances: 1
    host: SpringDemo-2
    path: target/springDemo-0.0.1-SNAPSHOT.jar
    disk quota: 1 G In an embodiment of the present invention, the remediation unit 222 is configured to apply a pre-defined remediation template on the application source code. In an exemplary embodiment of the present invention, the pre-defined remediation templates may be configured by the user for multiple anti-patterns. In an embodiment of the present invention, the remediation template comprises a set of actions performed to remediate the anti-pattern identified by the cloud readiness assessment tool 206. The remediation unit 222 implements the actions defined in the remediation templates on the application source code to remediate the anti-patterns. In an embodiment of the present invention, the remediation templates are applied based on the first and the second transformation recommendation paths.

In an embodiment of the present invention, the cloud native transformation unit 224 is configured to generate a cloud native code that is compatible with the selected cloud platform 230. In an embodiment of the present invention, the application transformation to cloud engine 210 may include a plurality of cloud native transformation units 224. In an embodiment of the present invention, the cloud native transformation unit 224 is configured to implement one or more stages of the semi-automated workflow based on the first and the second migration transformation recommendation paths.

In an embodiment of the present invention, one of the stages of the workflow include applying the one or more pre-defined transformation process flows onto the application source code. In an embodiment of the present invention, the pre-defined transformation process flow has a pre-processing and post-processing stage. The pre-processing stage prepares the code on which the transformation has to be applied. In an embodiment of the present invention, the pre-processing stage involves analyzing the source code and other context like target framework and determination of dependencies and versions required provided by the user at the input unit 202. In the processing stage, each of the plurality of cloud native transformation units 224 executes transformation of the application source code to the cloud native code in three distinct phases "detect" phase, "analyze" phase and "transform" phase. In an embodiment of the present invention, the cloud native transformation unit 224 in the "detect" phase determines if the pre-defined transformation process flow is applicable to the application source code.

In an embodiment of the present invention, the cloud native transformation unit 224 in the "analyze" phase analyses the application source code and determines the changes required to be made for transformation of the application source code to the cloud native code. In an embodiment of the present invention, the cloud native transformation unit 224 in the "transform" phase transforms the application source code to the cloud native code compatible with the cloud platform 230. In the post-processing stage, execution of actions which are common for one or more cloud native transformation units 224 is performed.

In an embodiment of the present invention, the post-processing stage involves generating instructions for the users to perform a plurality of updates to the application source code. The post processing stage also includes providing additional recommendations to the users and rendering details inferenced in the pre-defined transformation process flow to other pre-defined transformation process flows. In an embodiment of the present invention, the plurality of cloud native transformation units 224 are configurable to flexibily assemble the pre-defined transformation process flows. In an embodiment of the present invention, a plurality of transformation units 224 are combined to complete a transformation process flow. In an embodiment of the present invention, a new transformation process flow may be created by combining existing and new transformation units 224.

In an exemplary embodiment of the present invention, in the "transform" phase, the pre-defined transformation process flow includes a series of steps to transform the application source code into the cloud native code. In an exemplary embodiment of the present invention, the series of steps may include, but are not limited to, addition, deletion and modification of classes of the application source code. In yet another embodiment of the present invention, the series of steps may include but are not limited to, addition, deletion and modification of configuration files. In an embodiment of the present invention, the configuration files may include a plurality of files such as .xml files, .yml files and .properties files. In an embodiment of the present invention, the modification of the configuration files may include adding a dependency to .xml file. In an embodiment of the present invention, the series of steps may include building definitions of the classes of the application source code. In an embodiment of the present invention, building definitions of the classes may include creating a .java class file.

In another embodiment of the present invention, in the "transform" phase, the pre-defined transformation process flow may include modifying a configuration of the application source code or modifying the application source code itself. In an exemplary embodiment, conversion of the application source code to the cloud native code by modifying the source code itself may include selecting a pre-defined "Struts to Spring Boot" transformation process flow. The cloud native transformation unit 224 is configured to take source code written in Struts, make a series of changes and transform it into a Spring Boot based application which may be run on the cloud platform 230. In one example, the series of changes may comprise including a spring boot starter to a dependency. In another example, the series of changes may comprise including a struts to spring plugin. In another example, the series of changes may include adding a spring boot application. In another example, the series of changes may include adding a filter registration bean to a java configuration.

In another exemplary embodiment of the present invention, conversion of the application source code to the cloud native code by modifying source code itself may include selecting a pre-defined "maven to gradle" transformation process flow. The cloud native transformation unit 224 is configured to take the source code written in Maven, make a series of changes and transform it into a Gradle based application which may be run on a cloud platform 230. In one example, the series of changes may comprise porting maven configuration to a build.gradle. In another example, the series of changes may include creating a .gradle folder with a gradle wrapper files. In another example, the series of steps may include creating settings.gradle and gradlew files.

In another exemplary embodiment of the present invention, conversion of the application source code to the cloud native code by modifying source code itself may include selecting a pre-defined "spring MVC to spring boot" transformation process flow. The cloud native transformation unit 224 is configured to take the source code written in Spring MVC, make a series of changes and transform it into a spring boot based application which may be run on a cloud platform 230. In one example, the series of changes may comprise adding a spring-boot-starter-parent to a pom.xml file. In another example, the series of changes may comprise adding the spring-boot-starter-web dependency to the pom.xml file. In another example, the series of changes may comprise adding a spring-boot-maven plugin under the build section in the pom.xml file that has a spring-web dependency. In another example, the series of changes may include adding all filters in a Web.xml as a Java configuration beans. In another example, the series of steps may include adding a tomcat-embed-jasper dependency if jsp files are present. In another example, the series of steps may include crawling through all the pom files and updating them in case of multi-module project structure.

In another exemplary embodiment of the present invention, conversion of the application source code to the cloud native code by modifying source code itself may include selecting a pre-defined "WebSphere to TomEE Build pack" transformation process flow. The cloud native transformation unit 224 is configured to take the source code written in WebSphere Application, make a series of changes and transform it to a cloud native code and deploy it into a cloud platform 230. In one example, the series of changes may comprise identifying code related to a JNDI resource look up for a data source. In another example, the series of changes may comprise extracting JDNI Data source URL and checks if an entry already exists in the Web.xml. In another example, the series of changes may comprise creating a new resource-ref entry in a web.xml. In another example, the series of changes may comprise creating a new resources.xml file if it is not already present. In another example, the series of changes may comprise making a new entry for above identified JNDI data source URL. In another example, the series of changes may comprise identifying a new data source service instance name to be created. In yet another example, the series of changes may comprise creating a manifest file with entries for a build pack (TomEE build pack) and entry for a data source service instance.

In another exemplary embodiment of the present invention, conversion of the application source code to the cloud native code by modifying source code itself may include selecting a pre-defined "Apache CXF application to Spring Boot" transformation process flow. The cloud native transformation unit 224 is configured to take the source code written in Apache CXF application, make a series of changes and transform it into a Spring Boot application which may be run on a cloud platform 230. In one example, the series of changes may comprise removing old CXF dependencies and replaces the dependencies with new spring boot starter dependencies. In another example, the series of changes may comprise adding spring boot related classes, dependencies and plugins.

In another example, the series of changes may comprise adding all the filters, servlets, listeners in the Web.xml as Java configuration beans. In another example, the series of changes may comprise adding the Application Property files in the resources folder. In yet another example, the series of changes may comprise moving all the spring configuration bean files from WEB-INF to the resources . In another example, the series of changes may comprise addressing a spring dependency management with the help of bill of material (BOM). In another example, the series of changes may comprise updating the packaging to JAR if no JSPs are found in the source code. In another example, the series of changes may comprise removing Jackson dependency version, if found. In another example, the series of changes may comprise If JNDI data sources are found in the source code, then equivalent java configuration beans are added and old configurations are commented. In another example, the series of changes may comprise in case of multi-module project structure, crawling through all the build configuration files and updating them.

Figure 4F:
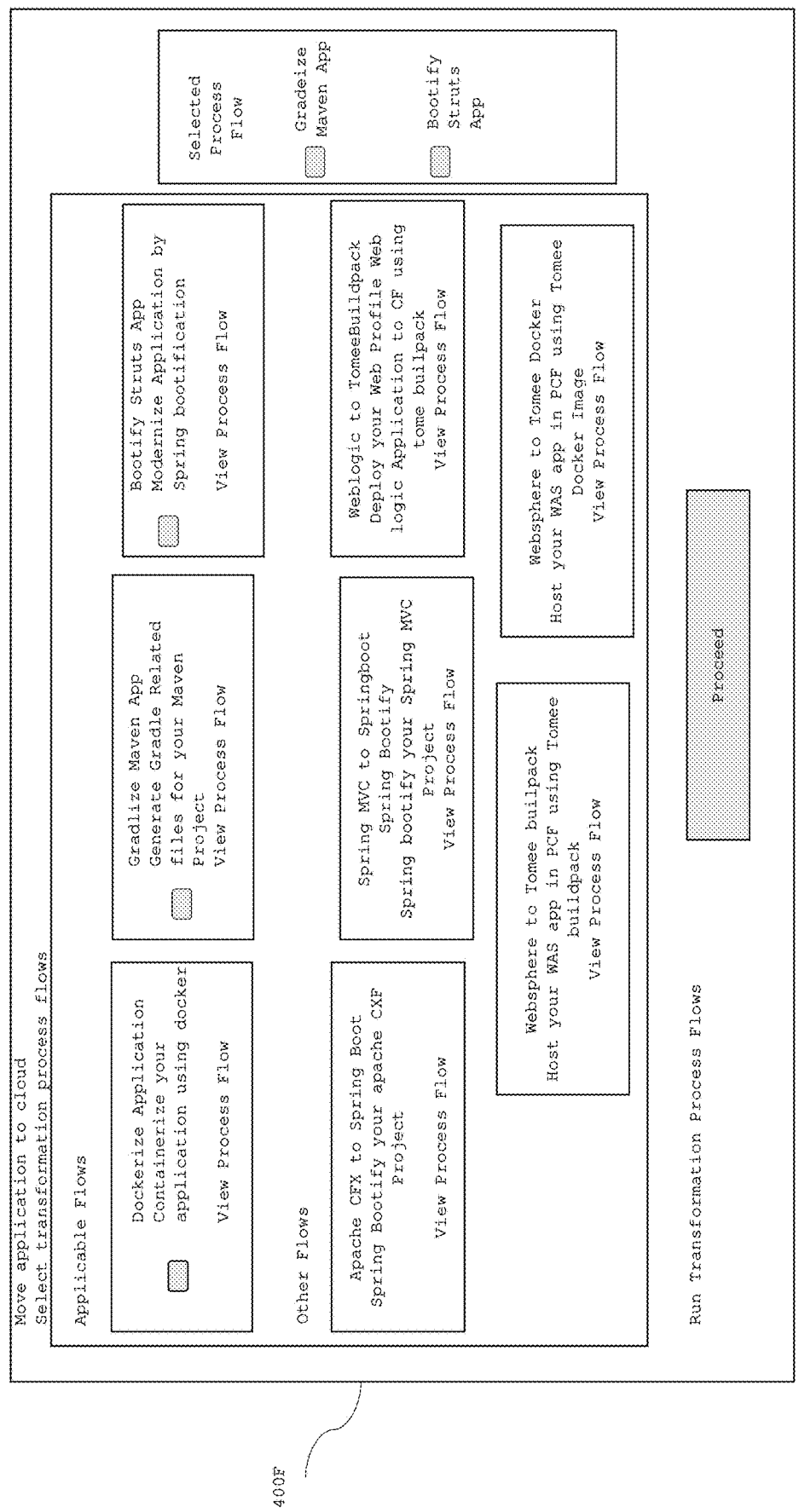
FIG. 4F is an exemplary graphical user interface that provides recommendations corresponding to a pre-defined transformation process flow specific to an application.

Referring to the FIG. 4F, a graphical user interface 400F is illustrated showing recommendations of the transformation process flows based on the first and the second transformation path recommendation selected by the user to transform the application source code into cloud native code.

In an embodiment of the present invention, after the cloud native code is generated by the cloud native transformation unit 224, the template distribution unit 226 is configured to apply reusable service templates. In an embodiment of the present invention, the reusable service templates apply repeatable code changes in the application source code. In an exemplary embodiment of the present invention, the distribution of the service templates may include distribution of a log configuration file that is to be added to the applications source codes that is being transformed to the cloud native code. In an embodiment of the present invention, the service templates are applied based on the first and the second transformation recommendation paths.

Figure 4G:
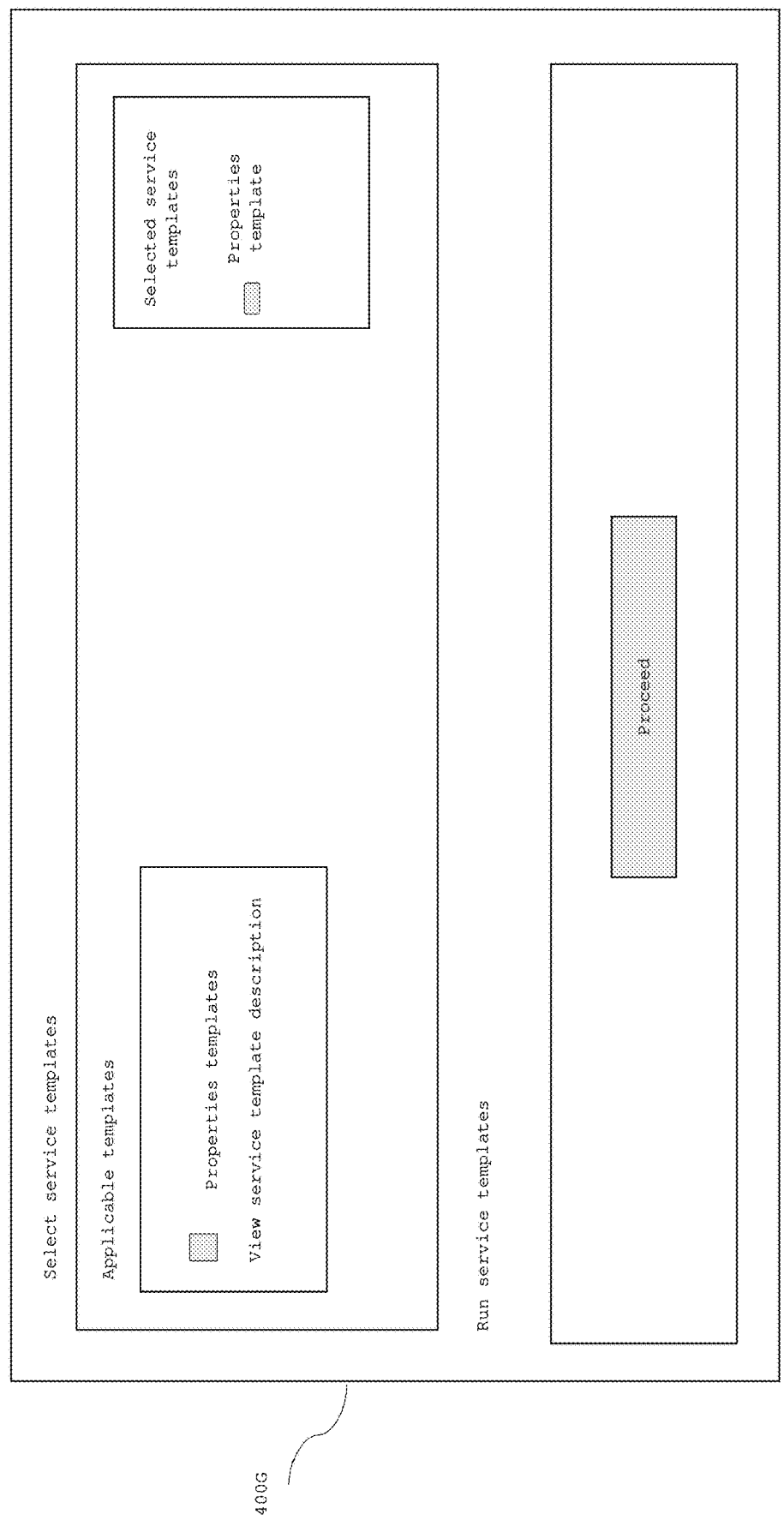
FIG. 4G is an exemplary graphical user interface that provides recommendations corresponding to a service template specific to an application.

Referring to the FIG. 4G, a graphical user interface 400G is illustrated for the selection of the service templates to add lines of code or edit build configuration in the source code.

In an embodiment of the present invention, after the distribution of service templates on the generated cloud native code, the continuous Improvement/continuous Deployment (CI/CD) pipeline builder unit 228 is configured to build a CI/CD pipeline for integration and deployment of the cloud native code to cloud platform 230. In an exemplary embodiment of the present invention, the CI/CD pipeline builder unit 228 creates a job to create the CI/CD pipeline such that the application source code is deployed onto the cloud platform 230 based on the first, second and third transformation recommendation paths. In an embodiment of the present invention, the CI/CD pipeline builder unit 228 uses the CI/CD templates defined by the users in the migration settings to create the CI/CD pipeline. In an embodiment of the present invention, support for cloud deployment is added for container and Orchestration platforms such as Docker and Kubernetes. In an embodiment of the present invention, support for kubernetes may be added by creating a CI/CD template that deploys application source code to a kubernetes cluster. In an exemplary embodiment of the present invention, the CI/CD pipeline builder unit 228 creates a new CI/CD pipeline with a plurality of user-defined stages such as unit testing, static code analysis, deployment strategy, security checks, cloud readiness analysis, and notification channels. In various embodiment of the present invention, the integration and deployment of the cloud native code on to the selected cloud platform is performed for the first, second, third and fourth migration transformation path recommendations. In an embodiment of the present invention, Github is a application source code repository platform that provides the application source code that may be deployed on the cloud platform.

Figure 4H:
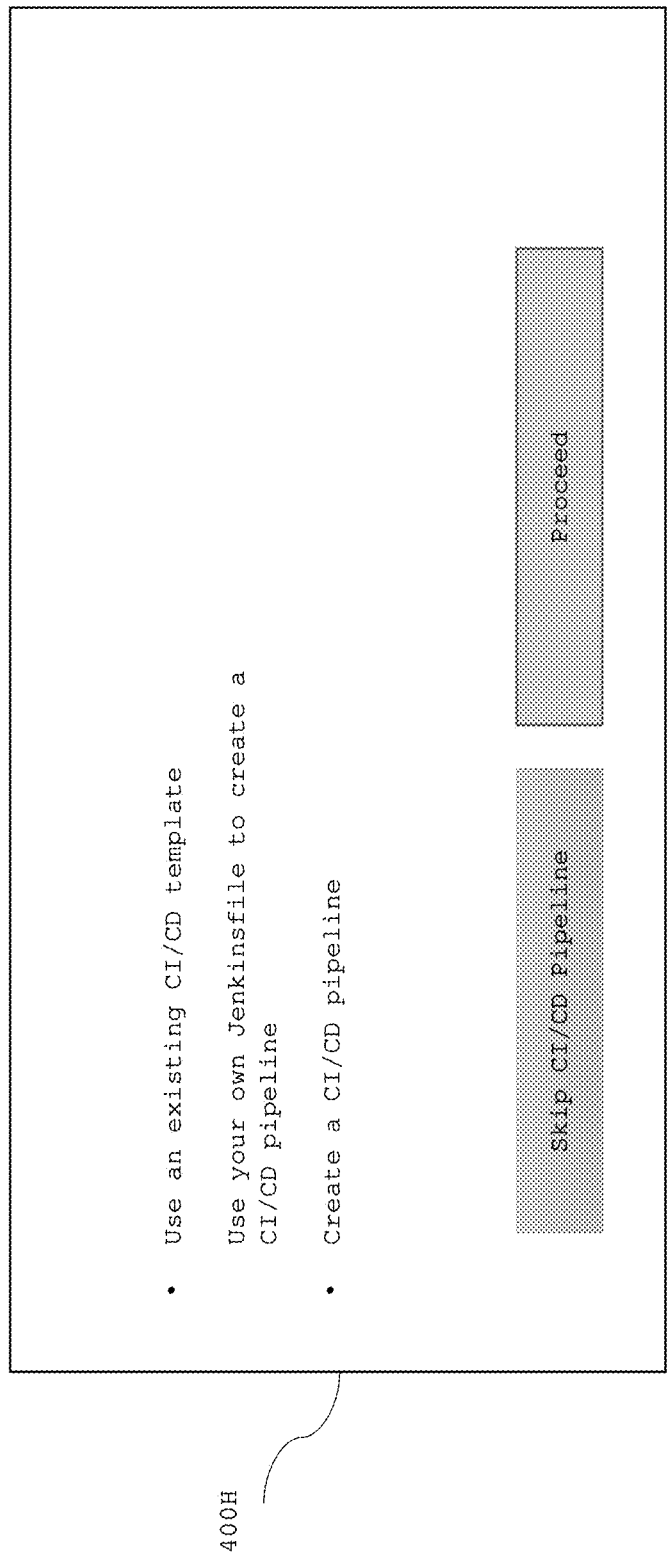
FIG. 4H is an exemplary graphical user interface that provides options to users to create Continuous integration (CI)/Continuous Deployment (CD) pipeline template.

Referring to the FIG. 4H, a graphical user interface 400H is illustrated showing options to create a Jenkins CI/CD pipeline for deployment of the source code to cloud platform 106. Either an existing CI/CD Jenkins file template may be selected or a new pipeline may be defined for the deployment of the source code to cloud platform 106.

In an embodiment of the present invention, the application transformation and cloud deployment system 100 comprises a microservices unit 236 (FIG. 2) configured to optimize assessment and implementation of microservices code for multiple target cloud platforms. The microservices unit 236 is configured to carry out optimized assessment and implementation of micro services code. The microservices unit 236 is configured to generate a detailed report indicating design patterns associated with the microservices code. The report may also include recommendations related to the patterns. In an embodiment of the present invention, the microservices unit 236 assesses microservices code developed from scratch or generated using code-generation tools. In an exemplary embodiment of the present invention, the microservices unit 236 performs assessment on new microservices code which are developed to address the microservices design pattern aspects. In another exemplary embodiment of the present invention, the microservices unit 236 performs assessment on code generated by microservices code generation tools to address the microservices design pattern aspects. In another embodiment of the present invention, the microservices unit 236 fetches application source code from different sources and assesses application source code targeted to be hosted on various cloud platform 106.

In an embodiment of the present invention, the microservices unit 236 comprises an assessment unit 236a configured to assesses the microservices code by determining a count of microservices anti-patterns in a microservices code. The anti-patterns represent a pattern of the microservices code that is not compatible with a target cloud platform and is not aligned with industry best practices on developing microservices architectures. In an exemplary embodiment of the present invention, the micro services anti-patterns are associated with features including, but not limited to, service discovery, API decomposition, reliability, service communication, fault tolerance and distributed tracing, transaction management, exception handling, caching, documentation, externalize configuration, code coverage, API security and observability. The microservices assessment unit 236a determines the count of microservices anti-patterns in a microservices code based on analysis of information including, but not limited to, group, sub-group, type, description, location, file, line number details associated with the anti-patterns.

In an embodiment of the present invention, the assessment unit 236a assesses the microservices code by ascertaining current state of the microservices code by determining a maturity score. The maturity score is indicative of an extent to which characteristics associated with the microservices code is aligned with predetermined microservices architecture characteristics.

Figure 4K:
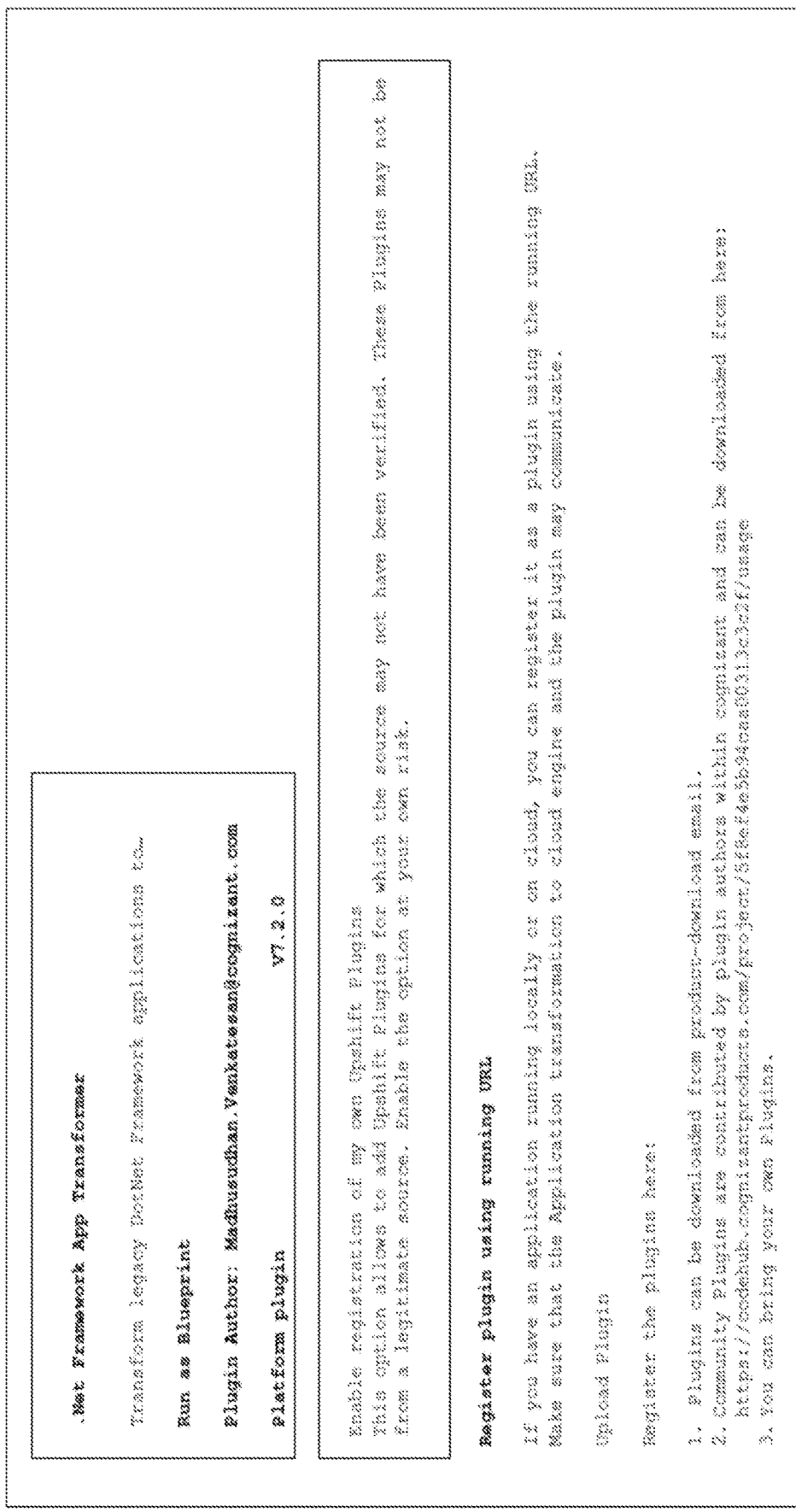
FIG. 4K illustrates a graphical user interface through which details such as repository location, source branch, target branch and target platform are rendered for selection, in accordance with yet another embodiment of the present invention.
Figure 4L:
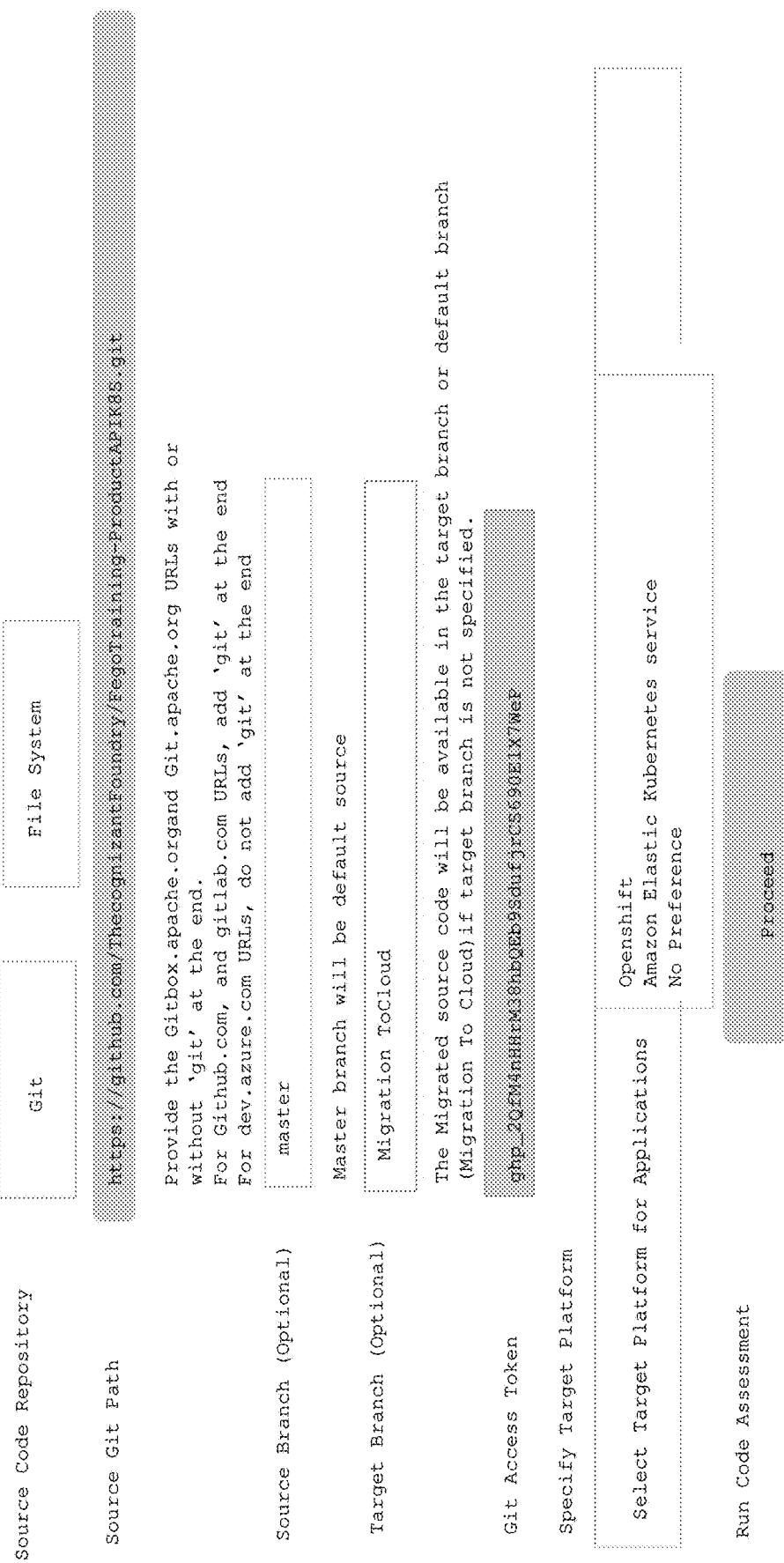
FIG. 4L illustrates a graphical user interface through which details such as repository location, source branch, target branch and a list of target platform values are rendered for selection, in accordance with an embodiment of the present invention.

In an embodiment of the present invention, the assessment unit 236a fetches input data from a user from a repository type including, but is not limited to, a source code repository and a folder location. In an exemplary embodiment of the present invention, source code repository is a remote Uniform Resource Locator (URL) of a greenfield application. In another exemplary embodiment of the present invention, a folder location includes a compressed zip file of the application source code. In case the repository type is a folder location, then the users may upload the code in the folder location. In the case of URL, input includes details such as Git Access token (using which the application source code may be accessed), source branch, target branch, boilerplate tool used to generate the application source code and a target branch of the target cloud platform 106, 230 (on which the microservices is deployed). Further, in the case of a folder location, the input includes details such as the application source code, boilerplate tool used to generate the application source code and target cloud platform 106, 230 (on which the microservices is deployed) In an exemplary embodiment of the present invention, FIG. 4I illustrates a graphical user interface through which project details such as technology, boiler plate code generation tools and a repository type are rendered for selection. In another exemplary embodiment of the present invention, FIG. 4J illustrates a graphical user interface through which project details such as technology, a list of boiler plate code generation tools and a repository type are rendered for selection. FIG. 4K illustrates a graphical user interface through which details such as repository location, source branch, target branch and target platform are rendered for selection, in accordance with an exemplary embodiment of the present invention. FIG. 4L illustrates a graphical user interface through which details such as repository location, source branch, target branch and a list of target platform values are rendered for selection, in accordance with another exemplary embodiment of the present invention. For the boilerplate tool, the user may choose from any of options such as spring initializer, micronaut, jhipster, etc. The user may also choose the option of 'I wrote my own code' if the application has not been auto-generated and developed from scratch. For the target platform, the user may choose from any one of the options such as openshift, amazon elastic kubernetes service, no preference etc. as illustrated in FIG. 4L. FIG. 4M illustrates details to be collected from the user when the source code repository option is selected as 'File System', in accordance with an exemplary embodiment of the present invention.

Figure 4N:
FIG. 4N illustrates a summary of the microservices assessment report, in accordance with an embodiment of the present invention.

Further, the assessment unit 236a employs details received as input to provide a comprehensive microservices-specific assessment report. The assessment report provides an analysis of current state of the application source code with respect to industry-wide implementation standards of microservices projects. The assessment report includes three sections that are, an assessment summary section illustrating overall count of micro services specific anti-patterns, a maturity score card section and a microservices anti-pattern analysis section that illustrates a break-up of all the anti-patterns found with information such as group, sub-group, type, description, location (file, line number details) and recommendation. The assessment summary section is a group-wise summary of the details provided in microservices anti-pattern analysis section. Further, the assessment report also includes two sections i.e. a technical summary section and a cloud anti-pattern analysis section. In an exemplary embodiment of the present invention, FIG. 4N illustrates a summary of the microservices assessment report providing the microservices anti pattern and cloud anti pattern details and a link for the user to download the report to the local system.

In an embodiment of the present invention, the maturity scorecard section has two subsections viz. architecture characteristics sub-section and architecture pattern sub-section. The architecture characteristics sub-section of the maturity score card section provides a characteristic score (on a scale of 0 to 10, with 0 being lowest and 10 being the highest) for the application source code. The characteristic score defines a degree or extent to which the current application is aligned towards standard microservices characteristics. In an embodiment of the present invention, a radar chart displays performance of the application across each of the microservices characteristics. The microservices characteristics used to arrive at the characteristic score are illustrated in the below table, in an exemplary embodiment of the present invention.

| Name | Definition | How is it measured | Weightage | Scoring Criteria |
|---|---|---|---|---|
| Granularity: LoC | Total lines of code indicate granularity of the application | Application's total lines of code are determined and applied on the scoring criteria | 3 | >500-High (0) 75-500 Correct (10) <75-Low (5) |
| Granularity: Open Interfaces | Less granular applications have limited number of publicly exposed interfaces | Number of public open interfaces are determined and applied on the scoring criteria | 4 | >20-Too High (0) 11-20-High (5) <10-Correct (10) |
| Cohension: External Calls | Degree to which the operations provided by a microservice cater to only one functionality | Number of controller classes and endpoints used to measure the number of operations catered to by the microservice | 6 | <=3-Correct (10) >3-too many services (0) |
| Loose Coupling | Usage of message-driven/event-driven architectures, Interface Segregation and Contract Driven Design decouples the dependencies between components | Number of messaging or even-driven patterns, the number of interface segregation libraries and contract-drive design frameworks are determined and applied on the scoring criteria. | 5 | Msg/Event driven patterns-+10 Interface Segregation pattern-+10 Contract Driven Design-+10 |
| Deployability | An effective Deployment strategy is important for a well-implemented microservice architecture | Number of deployment frameworks and the depth of their implementation is applied on the scoring criteria | 6 | Frameworks-Increment 5 points Anti-patterns-Decrement 0.5 points |

In an embodiment of the present invention, based on the scoring criteria shown in the above table, the assessment unit 236a is configured to determine a characteristic score. In an exemplary embodiment of the present invention, the characteristic score is determined by ascertaining a net score for each of the characteristics associated with the microservices code. The net score is based on an actual score and a weightage assigned to each of the characteristics as illustrated by the equation herein below:

$$\text{Normalized Score (characteristic)} = \text{Net score} / (\text{Weightage} * \text{Max Score}) * 10$$

The weightage is assigned based on a pre-defined numerical assessment of the relative importance of each of the characteristics. The actual score is a score assigned to each of the characteristics based on the source code scanning outcome and a predetermined scoring criterion. Further, a normalized score is determined for each of the characteristics associated with the microservices code. The normalized score is determined based on normalizing the net score against the maximum net score on a scale of 1 to 10 where the maximum net score is based on a predetermined numerical assessment of the maximum possible net score achievable by any microservices application, as illustrated by the equation herein below:

$$\text{Net Score (characteristic)} = \text{Actual Score (characteristic)} * \text{Weightage}$$

Finally, a final characteristic score is determined for the microservices code based on a sum of the net scores of all the characteristics and a maximum sum of the net score of all the characteristics where the maximum sum of the net score of all the characteristics is based on a predetermined numerical assessment of the maximum possible sum of the net score achievable across all the characteristics by any microservices application as illustrated by the equation herein below:

$$\text{Final App Score} = \text{Sum of Net Score} / \text{Max Sum of Net Score (i.e., 400)} * 10$$

In an embodiment of the present invention, the architecture pattern section of the maturity score card section provides a dashboard of different microservices design patterns and degree or extent of implementation of the microservices design pattern. In an exemplary embodiment of the present invention, the architecture patterns that make up the dashboard are including, but not limited to service discovery, fault tolerance, reliability, inter-service communication, security, distributed tracing, observability, API decomposition, performance and others (one common group for design patterns of code quality, documentation and external configuration). Further, a percentage number is presented on each of the architecture patterns indicating level of implementation. In an exemplary embodiment of the present invention, a number of 0%-40% on a design pattern indicates that the design pattern has either not been implemented or 'poorly-implemented'. In another exemplary embodiment of the present invention, a number between 40% and 70% indicates that the design pattern has been 'moderately-implemented'. In yet another exemplary embodiment of the present invention, a number greater than 70% on a design pattern indicates that it has been 'well-implemented'.

In an embodiment of the present invention, the microservices unit 236 comprises an accelerated transformation unit 236b that implements the microservices code by providing a set of repeatable steps associated with microservices code development in a bundled form for accelerated implementation of changes in the microservices code for deployment on the multiple target cloud platforms. The accelerated transformation unit 236b provides the set of repeatable steps based on execution of a pre-defined workflow to implement changes in the microservices code responsive to selection of one or more repeatable steps from the set of repeatable steps.

In an exemplary embodiment of the present invention, the accelerated transformation unit 236b is configured to accelerate implementation of changes in the microservices via a microservices development accelerated transformation path. In an exemplary embodiment of the present invention, once the user completes the 'microservices assessment' step, the user may click on 'proceed' in the accelerated transformation path to be taken to the 'workflow input selection page'. In another embodiment of the present invention, at the workflow input selection page, the user is presented with multiple 'workflow' choices to choose from. The workflow input page provide two views viz. one with workflow that is applicable for current project and another with workflow that is not-applicable for the current project. Further, the workflow is marked as 'applicable' based on current state of the application source code and based on the 'target platform' option selected in the first user input step of the accelerated transformation path. In an example, the accelerated transformation path is provided as below:

If the current application source code is a spring boot application, then all 'spring boot' based workflow will be marked as applicable. In this case, all workflows specific to other 'frameworks' will be marked as non-applicable.

If the 'target platform' option has been selected as openshift or amazon elastic kubernetes service, then all accelerated transformation paths that are specific to kubernetes are marked as applicable. In this case, all accelerated transformation paths specific to other platforms (like PCF, etc.) are marked as non-applicable.

In an embodiment of the present invention, the workflow comprises of a set of pre-defined steps that may modify the application source code of the project in-line with the implementation of modern microservices development projects. In the event any of the workflows are selected by the user, the workflow may apply pre-defined changes on the application source code and perform changes to the 'target branch' (specified in the first user input page) of the application source repository. In an exemplary embodiment of the present invention, the workflow, the steps and the criteria for its applicability is illustrated herein below:

| Greenfield Workflow Name | Objective | Suitability Criteria | Steps |
|---|---|---|---|
| Spring Boot Optimization | Optimization of Spring Boot Application for better performance | Spring-Boot projects | Lazy Initialization Removing most commonly unused dependencies Disabling JMX module |
| Circuit Breaker Pattern using Spring Cloud Resilience4J | Implementation of Circuit Breaker Pattern using Spring Cloud Resilience4J libraries | Spring-Boot projects | Add Spring Cloud Starter Resilience4J dependency Autowires CircuitBreaker instance |
| Distributed Tracing using Spring Cloud Sleuth | Implementation of Distributed Tracing using Spring Cloud Sleuth library | Spring-Boot projects | Adds Spring Cloud Sleuth dependency Adds application name property Autowires Tracer instance Add Sleuth Thread Config class |
| Caching using Spring Redis | Implementation of Caching using Spring Cache and Spring Data Redis libraries | Spring-Boot projects | Adds Spring Cache and Spring Data Redis dependencies Enables caching Enforces persistence Entities to implement the Serializable interface Adds Spring Cache annotations Adds default configurations and placeholder properties |
| Service Discovery Pattern using Spring Cloud Kubernetes | Implementation of Service Discovery Pattern using Spring Cloud Kubernetes libraries | Spring-Boot projects | Add Spring Cloud Kubernetes dependency Annotates EnableDiscoveryClient Autowires DiscoveryClient instance |
| Jacoco Code Coverage | Implementation of Code Coverage using Jacoco | Maven or Gradle Projects | Adds a plugin for Jacoco. Enables HTML/CSV/XML coverage reports. Enables coverage to be above 80% threshold. |
| Test Framework using TestNG | Implementation of Test Framework using TestNG | Maven or Gradle Projects | Add TestNG dependency Create TestNG Starter class |
| Static Code Analysis with SonarQube | Implementation of static code analysis by integration with SonarQube | Maven or Gradle Projects | Adds sonar plugin Adds sonar specific properties and configurations |

In an embodiment of the present invention, the user may choose one or more of the above workflow and the accelerated transformation path implements changes in the application source code. In an embodiment of the present invention, the workflow is a set of source code changes done to make it cloud native or microservices-native. The changes could be addition/modification/deletion of classes, configuration files, and build definitions. In an exemplary embodiment of the present invention, the "spring boot optimization" is the workflow available as part of the accelerate microservices accelerated transformation path where the accelerated transformation unit 236b takes the spring boot application source code and makes a series of changes or additions to it to ensure that the application may be run with faster startup times and minimal memory footprint. In an exemplary embodiment of the present invention, the system 200 is configured to process multiple types of files including XML (e.g., pom.xml, web.xml), groovy files (e.g., build-.gradle), source files (e.g., java), configuration files (e.g., application.properties, application.yaml). The microservices unit 236b also processes Pom.xml and web.xml files, which comprise specialized parsers to read, and updates them ensuring handling of granular aspects of the files.

In an embodiment of the present invention, the accelerated transformation unit 236b comprises an Abstract Syntax Tree (AST) parser that handles java application source code files. The AST parser represents the java application source code files as a tree structure of source code of a particular programming language. The AST parser includes nodes that denote a construct available in the application source code. The AST parser is used to parse, analyze, transform and generate java code. The AST parser enables cloud native transformer to read and generate java source code of any complexity. The accelerated transformation unit 236b is configured to handle codes based on multiple build tools such as Maven and Gradle. In an embodiment of the present invention, a groovy AST parser is used to read, write and modify gradle files. The accelerated transformation unit 236b also comprises a yaml parser which is used to read and modify yaml files.

Figure 4O:
FIG. 4O illustrates a greenfield accelerated transformation path, in accordance with an embodiment of the present invention.
Figure 4P:
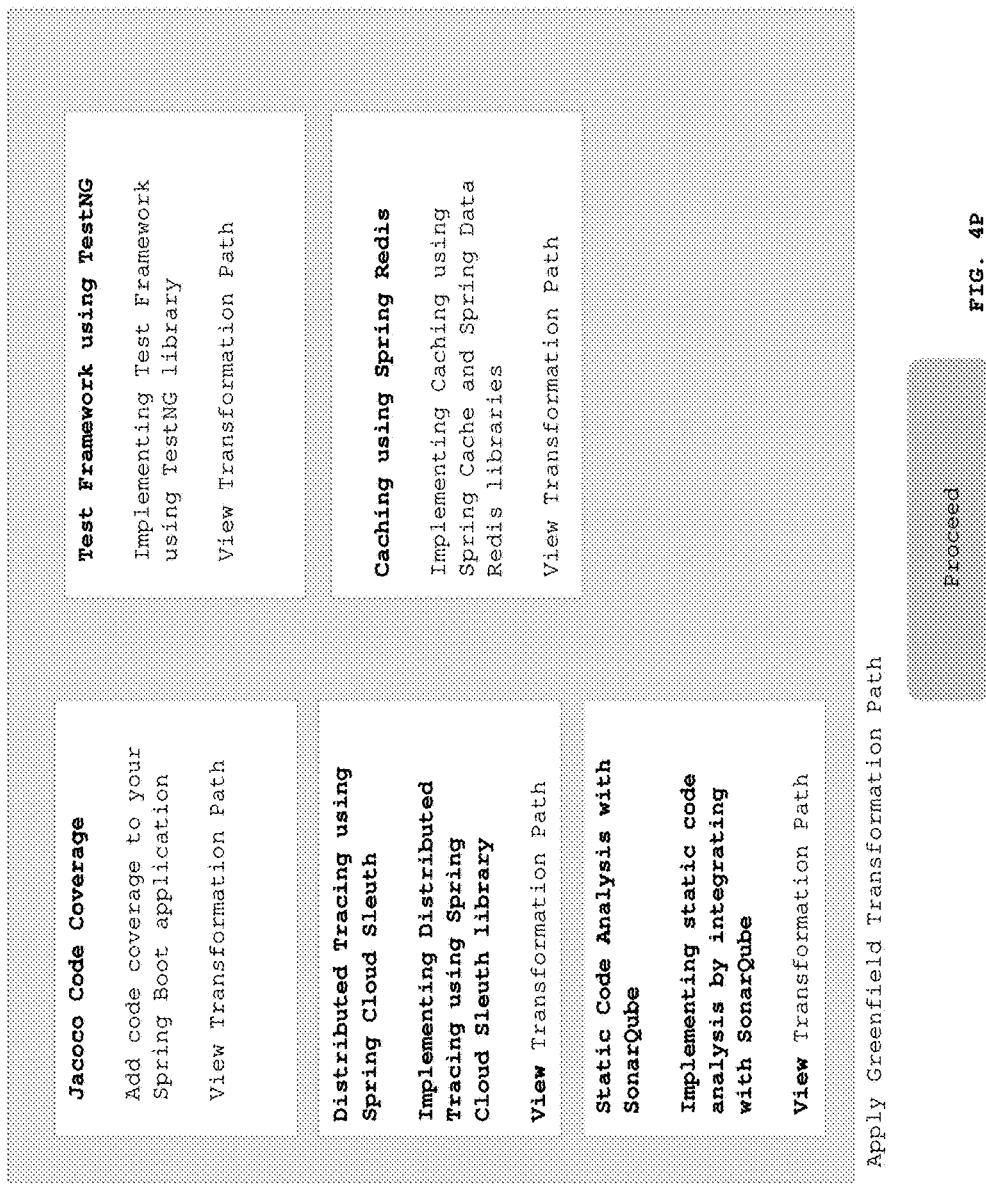
FIG. 4P illustrates a greenfield accelerated transformation path, in accordance with another embodiment of the present invention.
Figure 4Q:
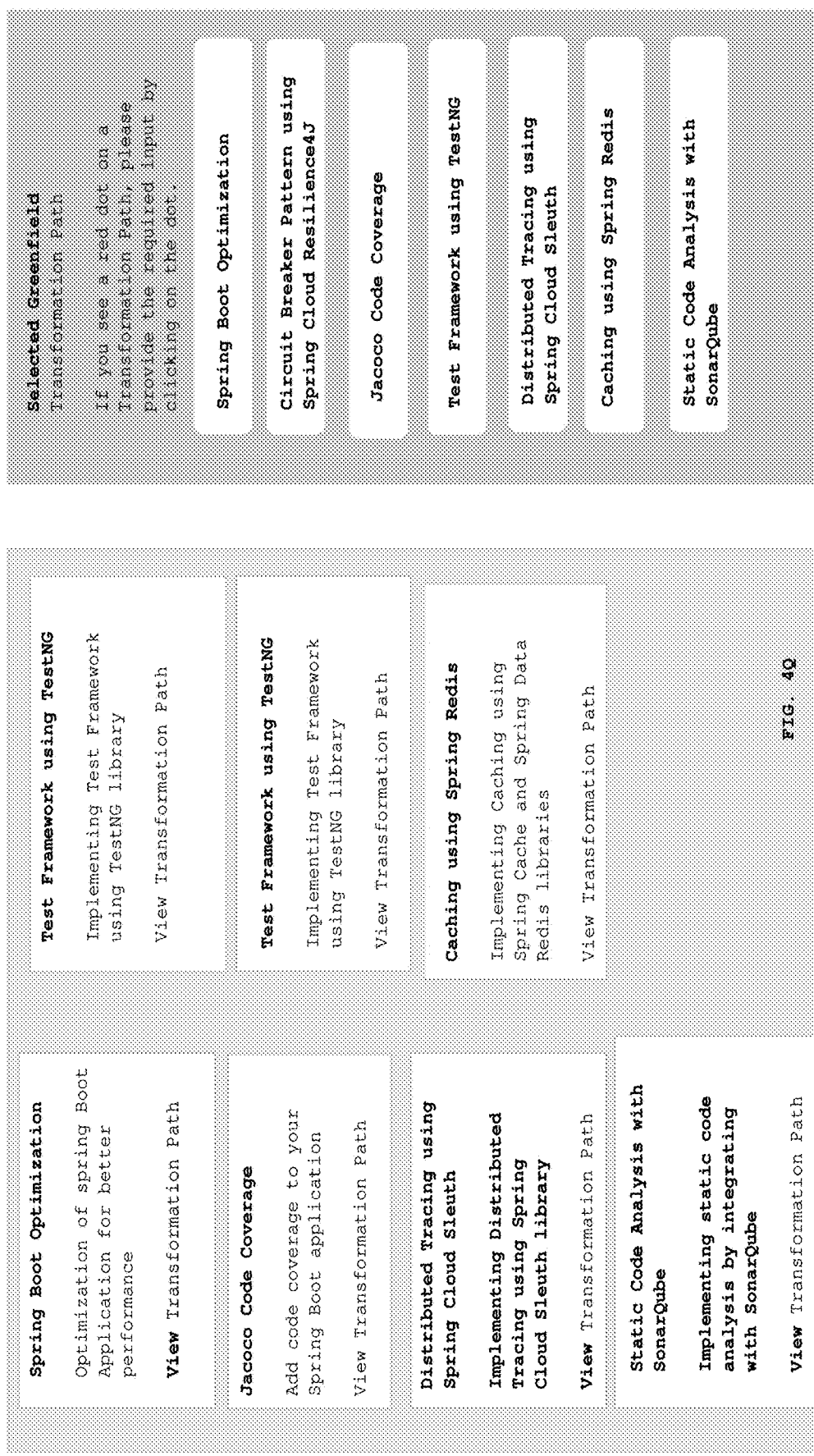
FIG. 4Q illustrates a greenfield accelerated transformation path, in accordance with yet another embodiment of the present invention.
Figure 4S:
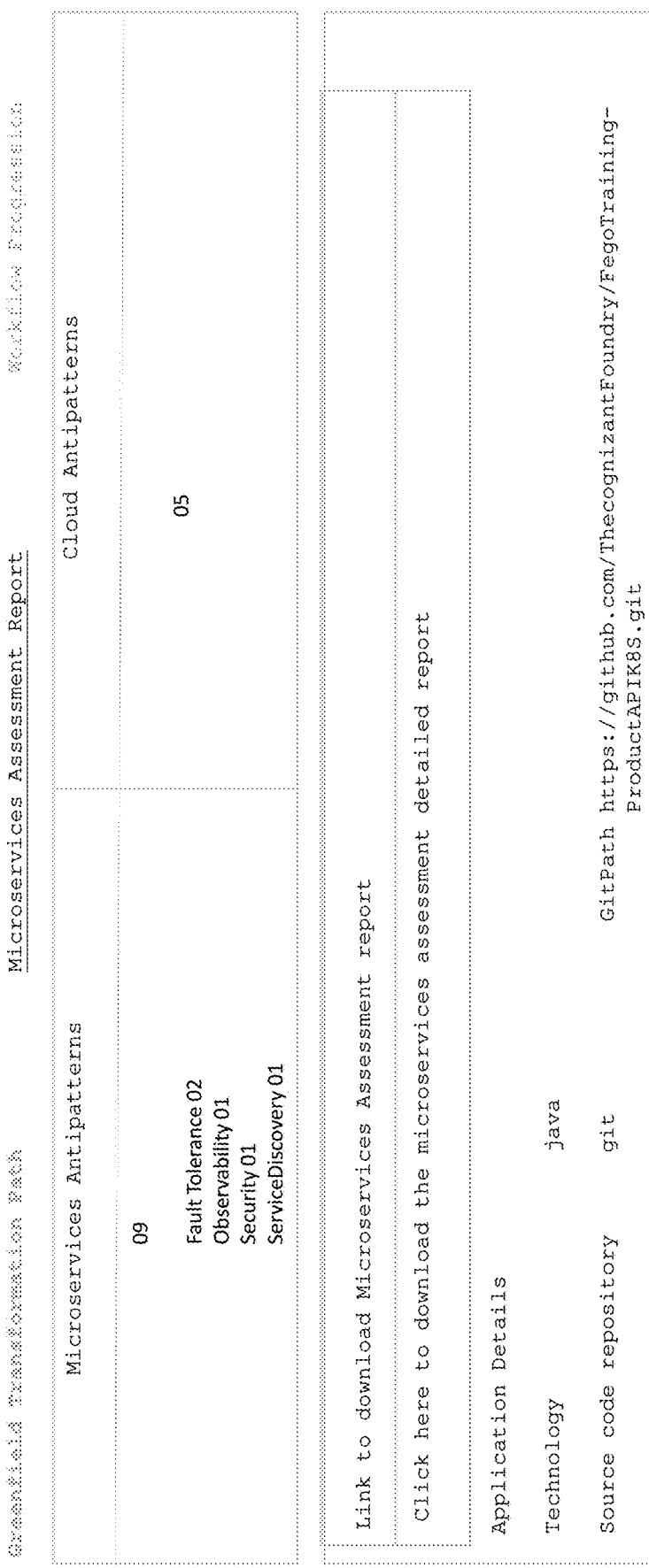
FIG. 4S illustrates a summary of the microservices assessment report which is an outcome of assessment execution, in accordance with an embodiment of the present invention.
Figure 4T:
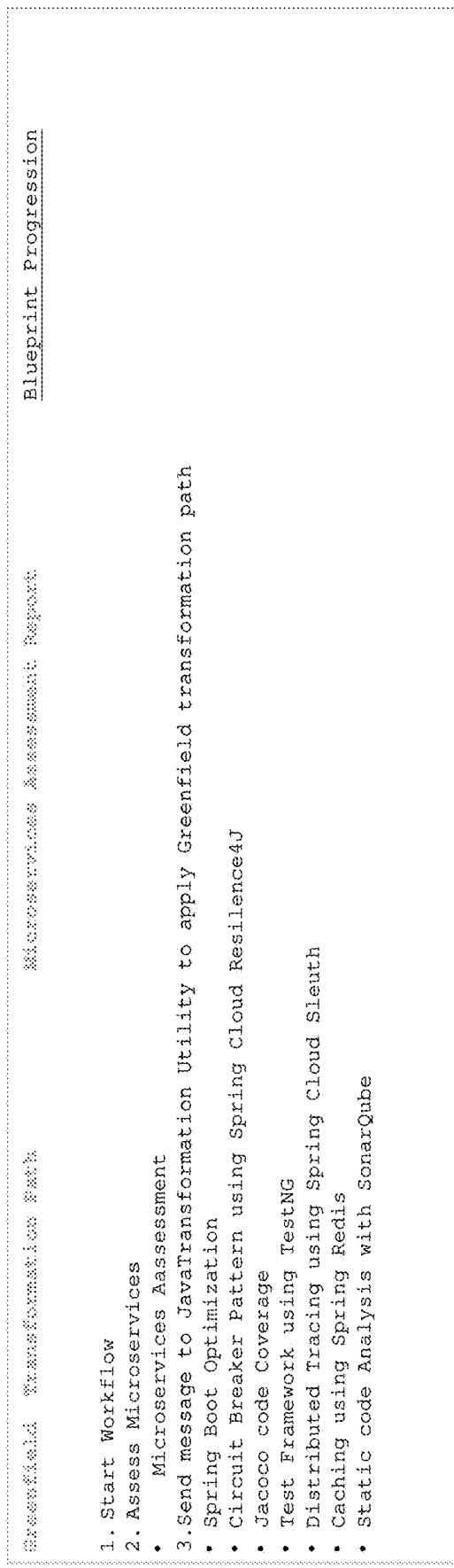
FIG. 4T illustrates steps for a completed workflow of greenfield assessment and transformation paths, in accordance with an embodiment of the present invention.
Figure 4U:
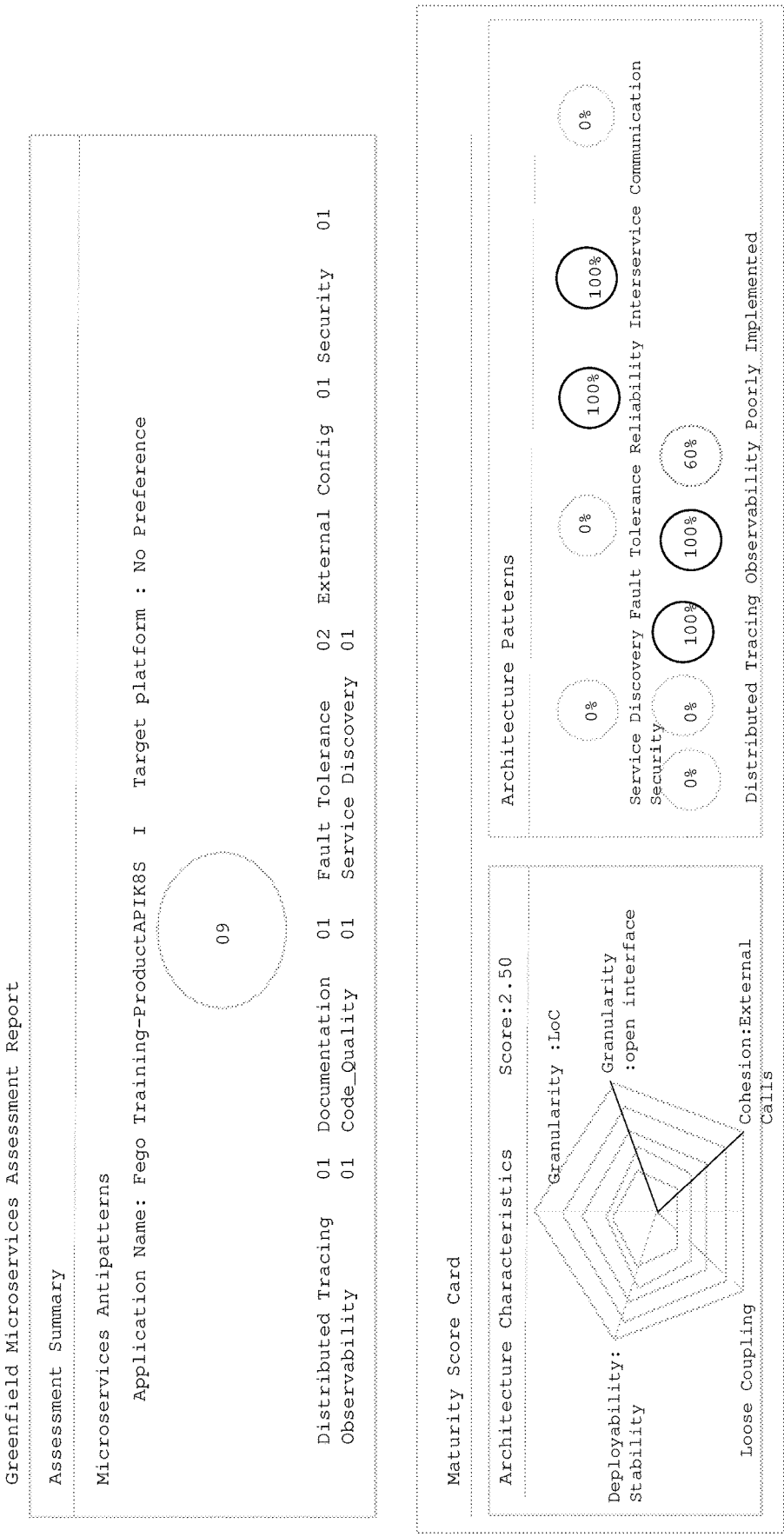
FIG. 4U illustrates a greenfield microservices assessment report showing a summary of the microservices anti-patterns detected and maturity score card with architecture characteristic and architecture patterns, in accordance with an embodiment of the present invention.

In an embodiment of the present invention, the greenfield workflow has a pre-processing and post-processing stage. The pre-processing stage processes the application source code on which the transformation is to be carried out. In the post-processing stage, actions such as providing additional recommendations to the users, passing details inferenced in this workflow to other workflows. Further, the accelerated transformation unit 236b is configured to handle code from a source code repository like Git or from a local file system. If transformations are applied on code checked out from Git, then the application source code is committed back to a repository in a new branch after the application of each greenfield workflow. FIG. 4N illustrates a summary of the microservices assessment report and FIG. 4O illustrates a greenfield accelerated transformation path. Further, FIG. 4P illustrates a greenfield accelerated transformation path. FIG. 4Q illustrates a greenfield accelerated transformation path and FIG. 4R illustrates a summary of the accelerated transformation paths, in accordance with an exemplary embodiment of the present invention. FIG. 4S illustrates a summary of the microservices assessment report which is an outcome of assessment execution, in accordance with another exemplary embodiment of the present invention. FIG. 4T illustrates steps for a completed workflow of greenfield assessment and transformation paths, in accordance with an exemplary embodiment of the present invention. FIG. 4U illustrates a greenfield microservices assessment report showing a summary of the microservices anti-patterns detected and maturity score card with architecture characteristic and architecture patterns, in accordance with an exemplary embodiment of the present invention. FIG. 4V illustrates a technical summary report indicating technology and external/internal dependencies, in accordance with an exemplary embodiment of the present invention. FIG. 4W illustrates microservices anti-pattern details, in accordance with an exemplary embodiment of the present invention. FIG. 4X illustrates cloud anti-pattern details, in accordance with an exemplary embodiment of the present invention.

In an embodiment of the present invention, the accelerated transformation path may comprise below mentioned steps:

Assessing microservices code that is generated using other code-generation tools;

Assessing microservices code for additional 'target platform' options like Google Kubernetes Engine (GKE), azure kubernetes service, IBM bluemix, lightbend, etc;

Assessing microservices code and identifying the 'stage of microservice design implementation' across values like traditional, inception/APIfication, cloud-native and mature;

Expanding coverage of 'deployability strategy' characteristic to include other frameworks of service mesh, log aggregators, canary models, blue/green models, etc;

Expanding coverage of 'loose coupling' characteristic to include other patterns like point-to-point, pub-sub, façade, adapter/wrapper and database per microservice;

Expanding coverage of design patterns to include service data replication pattern, command query responsibility segregation (CQRS) pattern and event-sourcing pattern;

Adding new greenfield recipes to expand capabilities in the below areas:

Generating remote method invocation capabilities based on Spring RestTemplate, LoadBalancer and retry frameworks;

Generating Istio-based service mesh templates to address functionalities of Service Discovery, Routing and Security;

Generating LinkerD-based service mesh templates to address concerns of Service Discovery, Routing and Security;

Implementing spring cloud contracts for spring boot or spring cloud projects;

Implementing spring data audit capabilities;

Generating spring cloud tasks for short-lived microservice projects;

Converting spring boot to micronaut or quarkus framework;

Converting sprint boot or spring cloud to reactive microservice frameworks like spring webFlux or vert.x;

Creating orchestration project to invoke existing project endpoints based on user-defined workflow model;

Generating TDD-based test methods and stubs to accelerate test coverage;

Adding the capability to deploy microservices; and

Exploring and adding capabilities to detect business capabilities and domains based on Domain-Driven Design (DDD) model.

Figure 3:
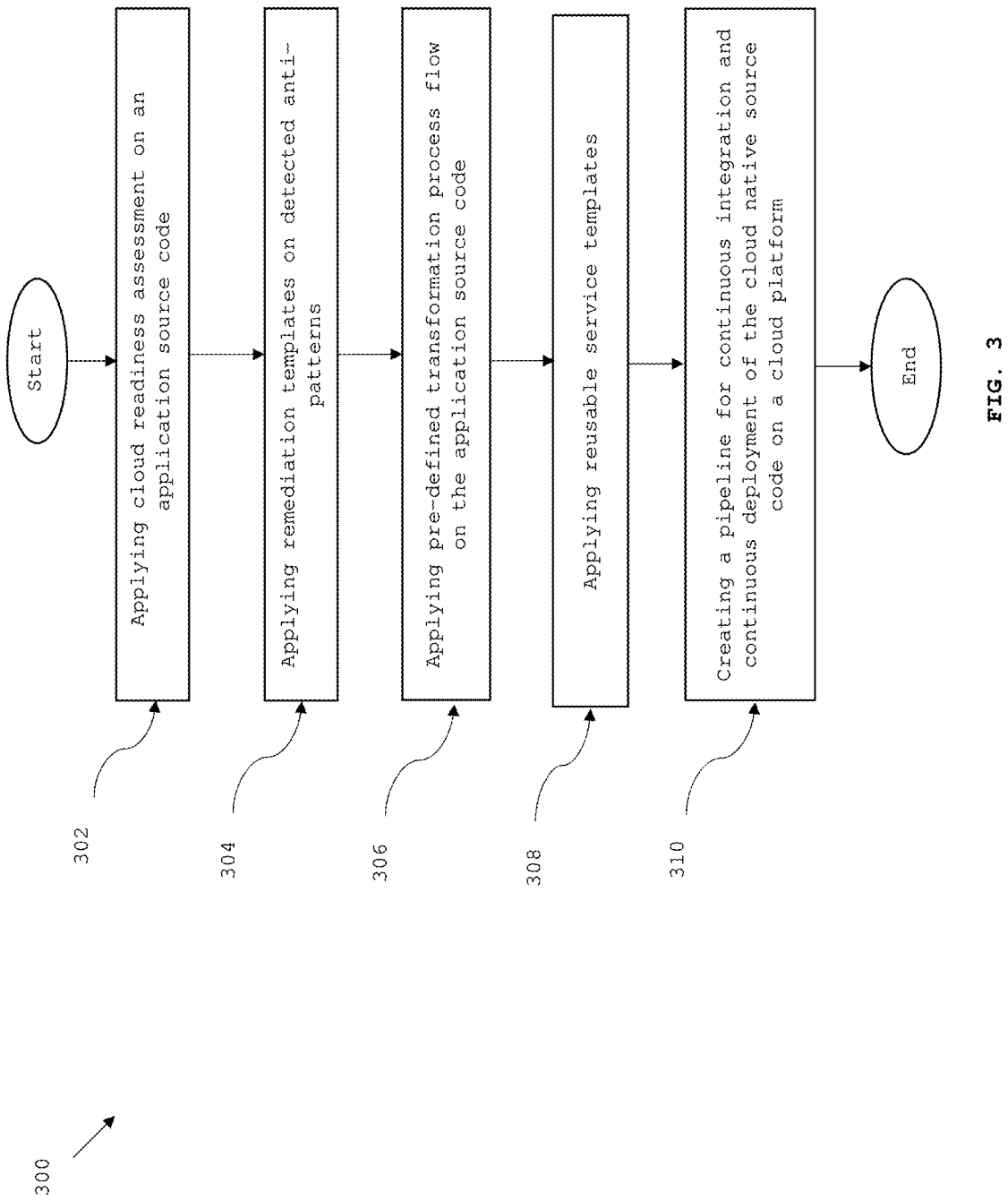
FIG. 3 is a flowchart illustrating a method for movement of application to cloud, in accordance with an embodiment of the present invention.

FIG. 3 is a flowchart illustrating a method for application transformation and cloud deployment by executing a semi-automated flow; in accordance with an embodiment of the present invention.

At step 302, cloud readiness assessment is applied on an application source code. In an embodiment of the present invention, the cloud readiness assessment is applied on the application source code and one or more migration transformation paths are recommended. In an embodiment of the present invention, the migration transformation recommendation includes a first transformation recommendation path. In an embodiment of the present invention, the first transformation recommendation path may be a "replatform" path which denotes that minimal code change would be required to move the application source code to the cloud platform. In another embodiment of the present invention, the migration transformation recommendation includes a second transformation recommendation path. In an exemplary embodiment of the present invention, the second transformation recommendation path may be a "refactor" path which denotes that a significant amount of changes to the source code would be required to move the application source code to the cloud platform. In yet another embodiment of the present invention, the migration transformation recommendation includes a third transformation recommendation path. In an exemplary embodiment of the present invention, the third transformation recommendation path may be a "rehost" path which denotes that the application source code can be moved to the cloud platform 230 with some configuration changes alone. In another embodiment of the present invention, the migration transformation recommendation includes a fourth transformation recommendation path. In an exemplary embodiment of the present invention, the fourth transformation recommendation path may be a "rebuild" path which denotes that the application source code cannot be reused and new application source code is to be written to host the application source code in the cloud platform 230. In an embodiment of the present invention, out of the transformation path recommendations, the cloud readiness assessment tool may suggest a particular transformation path recommendation which may be accepted by the user or may be overridden to choose another transformation path recommendation. In an exemplary embodiment of the present invention, the transformation path recommendations may be downloadable in a common separated values (CSV) format. In another embodiment of the present invention, the cloud readiness assessment report includes, but is not limited to technology stack stability and migration complexity.

At step 304, predefined remediation templates corresponding to anti-patterns are applied on the application source code to remediate the anti-patterns. In an embodiment of the present invention, the remediation templates comprise a set of actions performed to remediate the anti-pattern identified by the cloud assessment tool. In an embodiment of the present invention, the remediation unit implements the actions defined in the remediation templates on the application source code to remediate the anti-patterns. In an embodiment of the present invention, the remediation templates are applied based on the first and the second transformation recommendation paths.

At step 306, a pre-defined transformation process flow is applied on the application source code to transform the application source code into a cloud native code. In an embodiment of the present invention, the pre-defined transformation process flow is applicable based on the first and second migration transformation path recommendations. In particular, the pre-defined transformation process flow has a pre-processing, processing and post-processing stage. The pre-processing stage prepares the code on which the transformation has to be applied. In the processing stage, the transformation of the application source code to the cloud native code is executed in three distinct phases: "Detect" phase, "Analyze' phase and "Transform" phase.

In an embodiment of the present invention, in the detect phase it is determined if the pre-defined transformation process flow is applicable to the application source code. In another embodiment of the present invention, in the "analyze" phase, the application source code is analysed and the changes required to be made are determined for transformation of the application source code to the cloud native code. In another embodiment of the present invention, in the "transform" phase, the application source code is transformed to the cloud native code. In an exemplary embodiment of the present invention, the pre-defined transformation process flow includes a series of steps to transform the application source code into the cloud native code. In one example, the series of steps may include but are not limited to addition, deletion and modification of classes of the application source code.

In another example, the series of steps may include, but not limited to, addition, deletion and modification of configuration files. In yet another example, the series of steps may include building definitions of the classes of the application source code. In an embodiment of the present invention, the pre-defined transformation process flow may include modifying a configuration of the application source code or modifying the application source code itself. Examples of pre-defined transformation process flow for modifying the application code itself are provided in respect of the cloud native transformation unit 224. In the post-processing stage, additional recommendations are provided to the users.

At step 308, reusable service templates are defined based on the applied transformation process flow. In an embodiment of the present invention, the service templates apply repeatable code changes required for integration and deployment of the application source code to the cloud platform. In an embodiment of the present invention, the reusable service templates may be applied in the series of steps specified in the transformation process flow. In an exemplary embodiment, the distribution of the service templates may include distribution of a build configuration file that needs to be added to the applications source codes that is being transformed to the cloud native code. In an example, the service templates may include adding a new file with lines of codes and placeholders. In another example, the service template may include adding a build configuration for an application source code with Maven as build tool. In another example, the service templates may include adding a build configuration file for an application with Gradle as build tool. In another example, the service template may include adding a dependency in pom.xml file. In another example, the service template may include adding a filter bean configuration in web.xml file. In an embodiment of the present invention, the service templates are applied based on the first and the second transformation recommendation paths.

At step 310, a pipeline is created for continuous integration and deployment of the cloud native source code on a cloud platform. In an embodiment of the present invention, an option is provided to use an existing Continuous Integration/Continuous Deployment (CI/CD) pipeline template or create a new CI/CD pipeline from beginning via a graphical user interface. In an exemplary embodiment of the present invention, a deployment descriptor file Jenkins template creates a job to create the CI/CD pipeline such that the application source code is deployed onto the cloud platform based on the first, second and third transformation recommendation paths. In another embodiment of the present invention, the service templates are used create the CI/CD pipeline. In an embodiment of the present invention, support for cloud deployment is added for container and Orchestration platforms such as Docker and Kubernetes. In an exemplary embodiment of the present invention, a new CI/CD pipeline is created with a plurality of user-defined stages such as unit testing, static code analysis, deployment strategy, security checks, cloud readiness analysis, and notification channels.

Advantageously, the invention provides an integrated end-to-end process steps to kick start application cloud migration. It automates cloud native development, cloud readiness assessment, application code transformation, and creates and triggers CI/CD pipelines for Continuous Integration, Continuous Delivery and Continuous Deployment.

The system serves as an intelligent platform that crawls through an application source code, understands the landscape, structure, code & configurations and suggests suitable migration path specific to the application. No two applications will undergo the same transformation path as the system applies specific transformation steps based on the assessment findings for a particular application.

The transformation process flow that are applied as part of the semi-automated workflow are tried and tested automated transformation steps built based on the knowledge accumulated from extensive and deep cloud migration experiences of the cloud migration experts. The application transformation to cloud system lists the applicable transformation process flow for a particular application and also provides recommendations on the further manual actions to be performed on the application code. The transformation process flow facilitates migration teams with reusable transformation and cloud platform specific knowledge that can be applied to future transformation initiatives. The application transformation to cloud system saves the effort for identifying the correct transformation path by weeks.

The application to cloud transformation system reduces manual effort and brings in accuracy by integrating tools that automates the development and migration steps. In the cloud transformation journey, based on the emerging needs, the workflow steps can be customized with minimum code changes and several tools can be added or removed, enabling process improvement along the journey. The adaptable plugin framework of the system provides for seamlessly adding additional functionalities for accelerating application development or application to cloud transformation or accelerating greenfield application development or application to cloud transformation.

FIG. 5 illustrates an exemplary computer system in which various embodiments of the present invention may be implemented. The computer system 502 comprises a processor 504 and a memory 506. The processor 504 executes program instructions and is a real processor. The computer system 502 is not intended to suggest any limitation as to scope of use or functionality of described embodiments. For example, the computer system 502 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 506 may store software for implementing an embodiment of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In an embodiments of the present invention, operating system software (not shown) provides an operating environment for various softwares executing in the computer system 502, and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 510 may include, but not limited to, a keyboard, mouse, pen, joystick, trackball, a voice device, a scanning device, touch screen or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In an embodiment of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for application transformation to cloud by conversion of an application source code to a cloud native code, the system comprising:

a memory storing program instructions; a processor configured to execute program instructions stored in the memory; and an application transformation to cloud engine executed by the processor and configured to:

receive a first and a second transformation recommendation paths;

apply a set of remediation templates based on the first and the second transformation recommendation paths, wherein the set of remediation templates comprises pre-defined parameterized actions;

build definition of classes of the application source code;

apply a pre-defined transformation process flow on the application source code based on the first and the second transformation recommendation paths to transform the application source code to the cloud native code; and apply a reusable service template on the application source code, based on the first and the second transformation recommendation paths, wherein the reusable service template applies repeatable code changes required for integration and deployment of the cloud native code to a cloud platform, wherein the system comprises a microservices unit configured to optimize assessment and implementation of microservices code for multiple target cloud platforms by:

determining a count of microservices anti-patterns in a microservices code, wherein the microservices anti-patterns represent a pattern of the microservices code which is not compatible with a target cloud platform and is not aligned with industry best practices on developing microservices architecture;

ascertaining a current state of the microservices code by determining a maturity score, wherein the maturity score is indicative of an extent to which characteristics associated with the microservices code is aligned with predetermined microservices architecture characteristics; and providing a set of repeatable steps associated with microservices code development in a bundled form for accelerated implementation of changes in the microservices code for deployment on the multiple target cloud platforms.

2. The system as claimed in claim 1, wherein the micro services anti-patterns are associated with service discovery, API decomposition, reliability, service communication, fault tolerance and distributed tracing, transaction management, exception handling, caching, documentation, externalize configuration, code coverage, API security and observability.

3. The system as claimed in claim 1, wherein the maturity score is rendered via a radar chart depicting the scores across the characteristics associated with the microservices code.

4. The system as claimed in claim 1, wherein the microservices unit comprises an assessment unit configured to provide a repository type including at least one of a folder location where users upload application source code and a source code repository URL of the microservices code which provides details associated with the microservices code including Git access token, source branch, boilerplate tool used to generate a source code and a target branch of the target cloud platform for deployment of the microservices code.

5. The system as claimed in claim 1, wherein the microservices unit comprises an assessment unit configured to determine the count of microservices anti-patterns in a microservices code based on analysis of information including group, sub-group, type, description, location, file, line number details associated with the microservices anti-patterns.

6. The system as claimed in claim 1, wherein the maturity score comprises a characteristic score on a scale of '0' to '10' representative of the extent to which the characteristics associated with the microservices code is aligned with predetermined microservices architecture characteristics.

7. The system as claimed in claim 6, wherein the characteristic score is determined by:

ascertaining a net score for each of the characteristics associated with the microservices code, wherein the net score is based on an actual score and a weightage assigned to each of the characteristics associated with the microservices code, wherein the weightage is assigned based on a predefined numerical assessment of the relative importance of each of the characteristics associated with the microservices code, and wherein the actual score is a score assigned to each of the characteristics associated with the microservices code based on the source code scanning outcome and a predetermined scoring criterion;

determining a normalised score for each of the characteristics associated with the microservices code, wherein the normalised score is determined based on normalizing the net score against the maximum net score on a scale of 1 to 10, and wherein the maximum net score is based on a predetermined numerical assessment of the maximum possible net score achievable by any microservices application; and determining a final characteristic score for the microservices code based on a sum of the net score of the characteristics associated with the microservices code and a maximum sum of the net score of the characteristics associated with the microservices code, wherein the maximum sum of the net score of the characteristics associated with the microservices code is based on a predetermined numerical assessment of the maximum possible sum of the net score across the characteristics associated with the microservices code achievable by any microservices application.

8. The system as claimed in claim 1, wherein the maturity score associated with the patterns corresponding to the microservices code includes a percentage number associated with each of the patterns, and wherein the percentage number indicates a level of implementation of the microservices code.

9. The system as claimed in claim 8, wherein the percentage number includes a percentage number from 0% to 40% on the patterns associated with the microservices code that indicates that the pattern is either 'not implemented' or 'poorly-implemented', a percentage number between 40% and 70% that indicates that the patterns are 'moderately-implemented' and a percentage number greater than 70% that indicates that the patters are 'well-implemented'.

10. The system as claimed in claim 1, wherein the microservices unit comprises an accelerated transformation unit configured to provide the set of repeatable steps based on execution of a pre-defined workflow to implement changes in the microservices code responsive to selection of one or more repeatable steps from the set of repeatable steps.

11. A method for application transformation to cloud by conversion of an application source code to a cloud native code, the method executed by a processor via program instructions stored in a memory, the method comprising:

receiving a first and a second transformation recommendation paths;

applying a set of remediation templates based on the first and the second transformation recommendation paths, wherein the set of remediation templates comprises pre-defined parameterized actions;

building definition of classes of the application source code;

applying a pre-defined transformation process flow on the application source code based on the first and the second transformation recommendation paths to transform the application source code to the cloud native code; and applying a reusable service template on the application source code, based on the first and the second transformation recommendation paths, wherein the reusable service template applies repeatable code changes required for integration and deployment of the cloud native code to a cloud platform, wherein the method comprises:

optimizing assessment and implementation of microservices code for multiple target cloud platforms by:

determining a count of microservices anti-patterns in a microservices code, wherein the microservices anti-patterns represent a pattern of the microservices code which is not compatible with a target cloud platform and is not aligned with industry best practices on developing microservices architectures;

ascertaining a current state of the microservices code by determining a maturity score, wherein the maturity score is indicative of an extent to which characteristics associated with the microservices code is aligned with predetermined microservices architecture characteristics; and providing a set of repeatable steps associated with microservices code development in a bundled form for accelerated implementation of changes in the microservices code for deployment on multiple target cloud platforms.

12. The method as claimed in claim 11, wherein the method comprises:

providing a repository type including at least one of a folder location where users upload application source code and a source code repository URL of the microservices code which provides details associated with the microservices code including Git access token, source branch, boilerplate tool used to generate a source code and a target branch of the target cloud platform for deployment of the microservices code.

13. The method as claimed in claim 11, wherein the step of determining the count of microservices anti-patterns in a microservices code comprises analysis of information including group, sub-group, type, description, location, file, line number details associated with the microservices anti-patterns.

14. The method as claimed in claim 11, wherein the maturity score comprises a characteristic score on a scale of '0' to '10' representative of the extent to which the characteristics associated with the microservices code is aligned with predetermined microservices architecture characteristics.

15. The method as claimed in claim 14, wherein the characteristic score is determined by:

ascertaining a net score for each of the characteristics associated with the microservices code, wherein the net score is based on an actual score and a weightage assigned to each of the characteristics associated with the microservices code, wherein the weightage is assigned based on a predefined numerical assessment of the relative importance of each of the characteristics associated with the microservices code, and wherein the actual score is a score assigned to each of the characteristics associated with the microservices code based on the source code scanning outcome and a predetermined scoring criterion;

determining a normalised score for each of the characteristics associated with the microservices code, wherein the normalised score is determined based on normalizing the net score against the maximum net score on a scale of 1 to 10; and wherein the maximum net score is based on a predetermined numerical assessment of the maximum possible net score achievable by any microservices application; and determining a final characteristic score for the microservices code based on a sum of the net score of the characteristics associated with the microservices code and a maximum sum of the net score of the characteristics associated with the microservices code, wherein the maximum sum of the net score of the characteristics associated with the microservices code is based on a predetermined numerical assessment of the maximum possible sum of the net score achievable across the characteristics associated with the microservices code by any microservices application.

16. The method as claimed in claim 11, wherein the maturity score associated with the patterns corresponding to the microservices code includes a percentage number associated with each of the patterns, and wherein the percentage number indicates a level of implementation of the microservices code.

17. The method as claimed in claim 16, wherein the percentage number includes a percentage number from 0% to 40% on the patterns associated with the microservices code that indicates that the pattern is either 'not implemented' or 'poorly-implemented', a percentage number between 40% and 70% that indicates that the patterns are 'moderately-implemented' and a percentage number greater than 70% that indicates that the patters are 'well-implemented'.

18. The method as claimed in claim 11, wherein the step of providing the set of repeatable steps comprises execution of a pre-defined workflow to implement changes in the microservices code responsive to selection of one or more repeatable steps from the set of repeatable steps.

* * * * *